(12) United States Patent
Thakore

(10) Patent No.: US 11,831,644 B1
(45) Date of Patent: Nov. 28, 2023

(54) ANOMALY DETECTION IN WORKSPACES

(71) Applicant: Amazon Technologies, Inc., Seattle, WA (US)

(72) Inventor: Mayank Thakore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 17/117,815

(22) Filed: Dec. 10, 2020

(51) Int. Cl.
  *H04L 29/06* (2006.01)
  *H04L 9/40* (2022.01)
  *G06F 16/2455* (2019.01)

(52) U.S. Cl.
  CPC .......... *H04L 63/10* (2013.01); *G06F 16/2455* (2019.01); *H04L 63/20* (2013.01)

(58) Field of Classification Search
  CPC ....... H04L 63/10; H04L 63/20; H04L 63/107; H04L 63/108; H04L 63/1425; H04L 63/145
  USPC ............................................................ 726/1
  See application file for complete search history.

(56) References Cited

U.S. PATENT DOCUMENTS

| | | | |
|---|---|---|---|
| 9,420,002 B1 * | 8/2016 | McGovern | H04L 63/10 |
| 10,673,881 B2 * | 6/2020 | Alderson | H04L 45/20 |
| 10,999,309 B2 * | 5/2021 | Drummond | H04L 63/1425 |

* cited by examiner

*Primary Examiner* — Longbit Chai
(74) *Attorney, Agent, or Firm* — Lee & Hayes, P.C.

(57) ABSTRACT

Systems and methods for anomaly detection in workspaces are disclosed. For example, sensor data from sensors associated with a device is gathered and compared with contextual data associated with the device, the environment in which the device is situated, and/or sensitive data that is being accessed to determine whether an anomaly is detected indicating that the environment is unsecure for accessing the sensitive information. An automated action is performed to mitigate unsecure use of the sensitive information based at least in part on the detected anomaly.

20 Claims, 14 Drawing Sheets

1300

| Device ID 1302 | Known? 1304 | Device Type 1306 | Anomaly Indicator 1308 |
|---|---|---|---|
| Device A | Known | Loud Speaker | Audio |
| DLJ3248DDR2 | Unknown | Removable Storage | Data Copying |
| Device B | Known | Headphones | None |
| FL69VGK29FK | Known | Keyboard | Cadence |
| Device C | Unknown | Mobile Phone | Access |

800

Determine that first device is accessing sensitive data, first device associated with user profile data indicating authorization for first device to access sensitive data, wherein sensitive data includes data that is associated with one or more access controls to limit access except when authorized
802

In response to determining that first device is accessing sensitive data, analyzing sensor data generated by sensor of device configured to detect attributes of environment associated with first device
804

Query contextual data resource for contextual data associated with sensor data, contextual data indicating impermissible and permissible attribute contexts
806

Determine, from sensor data and contextual data, that unsecure condition is associated with environment, unsecure condition predetermined to indicate that environment is unsecure for accessing sensitive data
808

Determine action to take in response to unsecure condition
810

Cause action to be performed, action restricting unsecure use of sensitive data
812

```
┌─────────────────────────────────────────────────────────────┐
│ Receive sensor data generated by sensor associated with     │
│ first device, sensor configured to detect attribute of      │
│ environment associated with first device while first        │
│ device accesses first data associated with one or more      │
│ access controls to limit access except when authorized      │
│                            902                              │
└─────────────────────────────────────────────────────────────┘
                              │
                              ▼
┌─────────────────────────────────────────────────────────────┐
│ Receive, from contextual data resource, contextual data     │
│ associated with sensor data                                 │
│                            904                              │
└─────────────────────────────────────────────────────────────┘
                              │
                              ▼
┌─────────────────────────────────────────────────────────────┐
│ Determine, based at least in part on sensor data and        │
│ contextual data, that condition is associated with          │
│ environment, condition indicating environment is unsecure   │
│ for accessing first data                                    │
│                            906                              │
└─────────────────────────────────────────────────────────────┘
                              │
                              ▼
┌─────────────────────────────────────────────────────────────┐
│ Determine action to take based at least in part on condition│
│                            908                              │
└─────────────────────────────────────────────────────────────┘
                              │
                              ▼
┌─────────────────────────────────────────────────────────────┐
│ Cause action to be performed to mitigate unsecure access of │
│ first data                                                  │
│                            910                              │
└─────────────────────────────────────────────────────────────┘
```

FIG. 9

| Network ID 1202 | Known? 1204 | Public/Private 1206 | Location 1208 |
|---|---|---|---|
| Network A | Known | Private | 1234 A. St., City A, State A |
| 1593BCH76JD1 | Unknown | Private | Company A |
| Network B | Known | Public | Location A |
| 2KLKDFO4O68FFF5 | Known | Public | "Home" |
| Network C | Unknown | Public | Unknown |

| Device ID 1302 | Known? 1304 | Device Type 1306 | Anomaly Indicator 1308 |
|---|---|---|---|
| Device A | Known | Loud Speaker | Audio |
| DLJ3248DDR2 | Unknown | Removable Storage | Data Copying |
| Device B | Known | Headphones | None |
| FL69VGK29FK | Known | Keyboard | Cadence |
| Device C | Unknown | Mobile Phone | Access |

ANOMALY DETECTION IN WORKSPACES

BACKGROUND

Some individuals access sensitive data, such as pursuant to those individuals' duties as employees or contractors. Policies to prevent the improper use of such sensitive data exist. Described herein are improvements in technology and solutions to technical problems that can be used to, among other things, improve security of sensitive data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example process for anomaly detection in workspaces.

FIG. 9 illustrates a flow diagram of another example process for anomaly detection in workspaces.

FIG. 12 illustrates a table showing contextual information associated with network identifiers utilized for anomaly detection in workspaces.

FIG. 13 illustrates a table showing contextual information associated with connected devices utilized for anomaly detection in workspaces.

DETAILED DESCRIPTION

Figure 1:
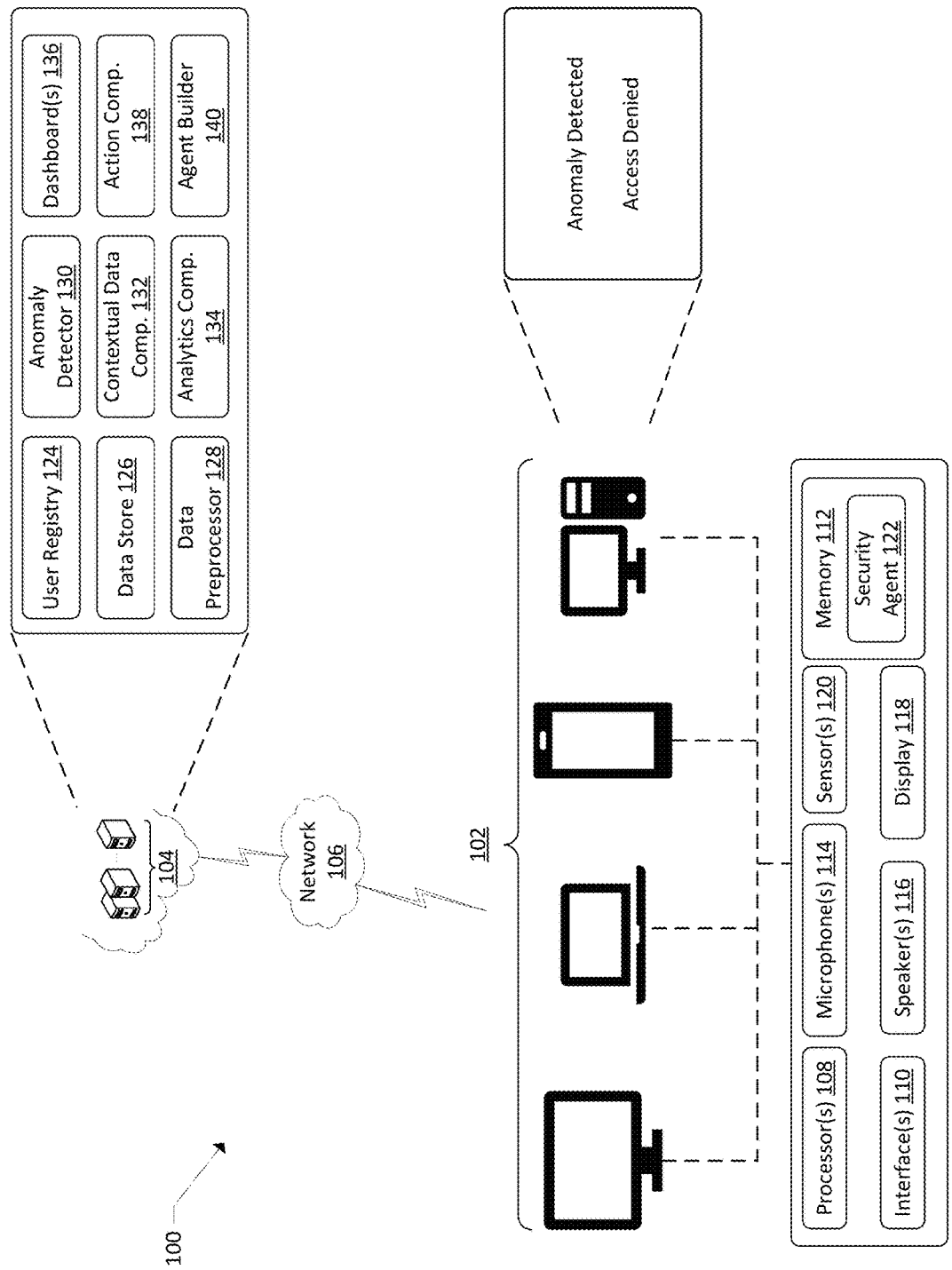
FIG. 1 illustrates a schematic diagram of an example environment for anomaly detection in workspaces.

Systems and methods for anomaly detection in workspaces are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in a vehicle (e.g., airplane, truck, car, bus, etc.) in a public forum (e.g., shopping center, store, etc.), for example.

In examples, users of the devices may be authorized to access and utilize sensitive data. For example, the users may be associated with user profile data indicating authorization to access and utilize certain sensitive data associated with a remote system. By way of example, a given user may be a customer service representative that is permitted to access and utilize sensitive information associated with customers, such as customer identifiers, customer addresses, customer payment information, device usage data, customer-provided audio data, image data, etc. By way of additional example, a given user may be a developer and/or data analyst, and that user may utilize certain sensitive data to develop and/or fix functionality of the device and/or other devices associated with the remote system. In further examples, the remote system may be associated with a speech processing system and voice interface devices that are utilized by numerous customers of the remote system. In these and other examples, the users authorized to access and utilize sensitive data may be individuals associated with the remote system that are engaged in troubleshooting customer issues and/or developing services for customers that utilize the voice interface devices.

Generally, individuals that are provided access to sensitive data work with the sensitive data in a secure physical environment, such as a specific room and/or building that is designated for accessing and utilizing the sensitive data. In these examples, one or more security policy restrictions may be implemented in the physical environment to reduce the possibility of policy violations associated with the sensitive data. For example, cellphones and/or other devices with recording functionality may be prohibited from being utilized in the physical space. Additionally, the devices being utilized to access the sensitive data may be specifically configured for that purpose and may restrict other functionality such as recording, accessing external sources, etc. Additional physical safeguards may include the configuration of the physical space such that users in the space can see and monitor each other and/or to allow for a manager or otherwise a supervisor to view and monitor sensitive data usage. Other physical safeguards include restricting access to the physical space to only those that are authorized, restricting the use of auxiliary devices that may result in unintended sharing of sensitive data, and the use of predetermined network access points. However, utilizing a specifically-designated physical space to allow users to access and utilize sensitive data may not be available in many circumstances, including circumstances where users are not permitted to physically come into an office, when users work remotely from the physical office, and/or other circumstances that make it difficult for users to travel to a specific location, and/or when a physical location is shared or otherwise accessed by someone not entitled to the access controlled information and/or systems. In these and other circumstances, the users may access and utilize sensitive data "virtually" or otherwise from computing devices that are situated in environments that are not specifically configured with physical mechanisms for securing access of sensitive data, such as user homes and/or communal workspaces. Maintaining adherence to policies that prevent or otherwise hinder improper use of sensitive data is still preferred in these scenarios.

To assist in adherence to such policies, techniques described herein allow for anomaly detection in shared workspaces. For example, users who are authorized to access and utilize sensitive data may be associated with a computing device. The computing device may correspond to a device identifier that is associated with user profile data for the user. A user registry may store the user profile data indicating the device identifier and sensitive data access authorizations. The sensitive data access authorizations may indicate what sensitive data the user is authorized to access, and/or one or more functions that are authorized to be performed by the user, such as how the sensitive data is authorized to be accessed and utilized. These users may utilize the devices in environments that are not specifically designated as a physical space for sensitive data access, such as user homes, for example. One or more of a user's devices may have installed thereon a security agent, which may be a component configured to query one or more sensors of the device, and/or sensors that are otherwise associated with the device and able to share sensor data. The sensor data can then be used to detect anomalies in the unsecured and/or shared physical environment where the device(s) are able to access the sensitive information. For example, the sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the device, Bluetooth and/or other short-range communication components configured to determine what devices are wirelessly connected to the device, device-connection sensors configured to determine what devices are physically connected to the device, and/or one or more other sensors configured to detect a physical condition of the device and/or the environment in which the device is situated.

The security agent may be installed on the device and/or may otherwise be accessible by the device. The security agent may be configured to determine when to query the one or more sensors associated with the device and/or to determine how to process the sensor data received from the sensors. For example, the security agent may be configured to query the sensors when the security agent receives an indication that a triggering event has occurred. Example triggering events may include when the device is in an "on" state, when the device is connected to a wireless access point, when one or more applications associated with sensitive data access are running on the device, when sensitive data is being displayed on a display of the device, when the device requests sensitive data such as from the remote system, when the user attempts to perform one or more actions associated with the sensitive data, upon the occurrence of a scheduled and/or periodic time and/or event occurring, upon receiving a request to perform anomaly detection such as from another device and/or the remote system, and/or one or more other triggering events associated with the access and/or usage of the sensitive data. An additional triggering event includes when a manager indicates the possibility of an anomaly. For example, a manager may view information associated with sensitive data usage, such as on a dashboard as described herein. The manager may determine that the information may indicate an anomaly, and user input data indicating as much may be utilized for triggering the operations described herein. The sensors may then generate sensor data and provide the sensor data to the security agent. In some examples, the security agent may be configured to receive the sensor data and send the sensor data to the remote system for further processing and anomaly detection. In these examples, the sensor data may be encrypted and/or otherwise formatted to hinder nefarious actors accessing the sensor data. Additionally, or alternatively, the security agent may be configured to perform some or all of the anomaly detection operations described in more detail herein. It should be understood that any time collection of sensor data is described herein as being performed on the device that is accessing sensitive data, the sensor data may additionally, or alternatively, be collected by one or more other devices.

In examples where the security agent sends the sensor data to the remote system, a data store may be configured to receive the sensor data from the device. The data store may store the sensitive data prior to processing for anomaly detection and/or the data store may provide information to a data preprocessor. The information may indicate a data type of the sensor data and/or one or more other attributes of the sensor data, such as which device identifier is associated with the sensor data, which user profile data is associated with the sensor data, time information associated with the sensor data, an identifier of the sensitive data that is being accessed when the sensor data was received, and/or any other information associated with the sensor data. The data store may then provide the sensor data to the data preprocessor, such as in response to a query for the sensor data from the data preprocessor and/or without receiving a specific request for the sensor data.

The data preprocessor may be configured to receive the sensor data and preprocess the sensor data into a format that is acceptable as input to an anomaly detector. For example, the anomaly detector may be configured as a given model, such as a machine learning model. Based at least in part on the type of model being utilized, the data preprocessor may preprocess the sensor data into a format that is usable by the anomaly detector. The data preprocessor may also be configured to query and receive contextual data associated with the sensor data for use by the anomaly detector. For example, the data preprocessor may have access to a contextual data component that is configured to store and/or access contextual data that may be utilized for anomaly detection. Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device, device capabilities associated with the auxiliary devices, sensitive data authorization information, peer data usage information, historical sensitive data usage information, and/or any other information associated with the sensor data and/or usage of the sensitive data. The data preprocessor may be configured to determine what contextual information to request from the contextual data component based at least in part on the type of sensor data that is received from the security agent and/or based at least in part on the user profile data associated with access of the sensitive data. For example, when the sensor data is audio data, the data preprocessor may be configured to query the contextual data component for reference audio data and/or audio signatures associated with the user profile data. In this way, sample audio data from the environment may be compared to the reference audio data to determine if the sample audio data indicates an anomaly. By way of further example, sample image data may be compared to reference image data to determine if the sample image data indicates an anomaly. Additional examples of contextual data usage for anomaly detection purposes are described below with respect to the anomaly detector. In these and other examples, the contextual data may provide a baseline and/or otherwise an indicator of secure environments and unsecure environments. This information may be presented to users of the system and/or be available for analysis, such as in conjunction with anomaly detection.

The anomaly detector may be configured to receive input data from the data preprocessor and to utilize the received data to detect one or more anomalies associated with the environment in which the device is situated and/or in the usage of the sensitive data by the user. In examples, the anomaly detector may include a model configured to apply one or more heuristics for detecting anomalies and the anomaly detector may utilize one or more types of the sensor data described herein to detect anomalies. For example, when the sensor data is audio data, the anomaly detector may be configured to determine whether the audio data includes user speech and to analyze the audio data to determine how many voices make up the user speech. In instances where more than one voice is detected, particularly when the contextual data indicates that only one user in the environment is authorized to access sensitive data by the device in question, the anomaly detector may determine that an anomaly is present, here the possibility of an unauthorized user being in the environment. By way of further example, when the sensor data is image data, the anomaly detector may be configured to determine whether the image data depicts more than one person in the environment. In instances where more than one person is depicted, particularly when the contextual data indicates that only one user is authorized to access sensitive data by the device in question, the anomaly detector may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector may be configured to determine whether the devices connected to the device in question indicate an unsecure environmental condition. For example, a device type of a connected auxiliary device may indicate the capabilities of the device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may indicate an anomaly. For example, a given device may typically have a certain number of connected auxiliary devices associated with it and/or the identifiers of the typical connected auxiliary devices may be known. When the sensor data indicates an increase in the number of connected auxiliary device and/or indicates a previously-unidentified connected auxiliary device, such an indication may correspond to an anomaly. In general, the anomaly detector may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, the use of an auxiliary device to record the sensitive data such as the taking of a picture of the device display, recording of audio, copying of data, etc.

In examples where an anomaly is detected by the anomaly detector, one or more actions may be taken based at least in part on the anomaly that is detected. For example, an indicator of the anomaly may be sent from the anomaly detector to an action component. The action component may be configured to determine an action to be performed based at least in part on the anomaly. The actions may include, for example, sending a notification of the anomaly to the device that is accessing the sensitive data, sending a notification to another device such as a device associated with a manager, restricting access to the sensitive data, ceasing authorization to the sensitive data by the user, causing the sensitive data to be prevented from being displayed, locking the device in question, causing the device in question to shut down, and/or one or more other actions. To do so, particularly when the action includes the device in question performing one or more operations, a command to perform the action may be sent to the security agent of the device and the security agent may cause the device to perform the action.

In at least some examples, the detected anomaly may be of a specific type and/or may be associated with a given risk type and the anomaly type and/or risk type may indicate the action to be performed. In examples where the risk type and/or anomaly type indicates a less severe policy violation than in other examples, the anomaly detector may send an indication of the detected anomaly to one or more dashboards configured to display detected anomalies. It should be understood that indications of detected anomalies may be provided to the dashboards regardless of severity, in examples. The dashboards may be accessible to managers and/or other personnel associated with the remote system, and the dashboards may be configured to receive user input associated with the anomalies. For example, a manager may provide user input indicating that the detected anomaly is problematic or not, and that user input may be utilized to determine an action to be performed. The dashboards may also provide historical information about detected anomalies, including anomalies associated with given user profile data, given devices, given sensitive data, etc. This information may be acted on by the device users and/or the managers for performing actions as described herein.

In addition to the use of sensor data as described herein, the anomaly detector may be configured to utilize sensitive data usage information to detect anomalies. For example, as users access and utilize sensitive data, usage data representing that usage may be stored and analyzed to determine if usage at a given time corresponds to the historical usage. For example, if the historical usage data indicates that only given sensitive data is historically accessed, and/or that certain quantities of sensitive data are historically accessed, and/or that the sensitive data is historically accessed for certain periods of time, and/or that the sensitive data is utilized in only certain ways, then when data access and/or usage deviates from this historical data usage, such as by at least a threshold amount, then an anomaly may be detected. Additional data such as user input cadences and/or user input types may be utilized. For example, the way a given user provides user input, such as typing, mouse usage, etc. may be utilized to determine if a deviation is present and thus an anomaly. In addition to the above, peer evaluation of sensitive data usage may be utilized by the anomaly detector to detect anomalies. For example, the user may be associated with a peer group that is authorized to utilize certain sensitive data and/or to utilize the data in certain ways. When an individual user of the peer group is utilizing different data from that used by the group and/or when the data usage differs from usage by the group, such indications may represent an anomaly detected by the anomaly detector. The anomaly detector may be configured to utilize some or all of the input signals described herein to detect anomalies and/or to determine confidence values associated with detection of anomalies.

It should be understood that prior to any sensor data being collected or utilized as described herein, the users of the devices may be made aware of the sensor data collection and users may provide authorization for such use. Such a notification may be provided when the user is provided access to the sensitive data, when the user turns on the device, when the user accesses given programs, or otherwise. Additionally, for certain types of sensor data, such as image data, specific authorization may be requested and received from users before that data is sent from the device to another device or system.

Additionally, an analytics component may receive the sensor data, contextual data, and/or indications of detected anomalies as described herein. The analytics component may be configured to utilize the data it receives to determine one or more improvements to how the security agent detects anomalies and/or gathers sensor data. For example, the analytics component may indicate the types of sensor data typically involved in detected anomalies, specific anomalies that have been detected, rates of detected anomalies, etc. This information may be utilized by the analytics component to determine how the security agent should query for sensor data. An agent deployer may receive this information from the analytics component and utilize the information to build the security agents described herein. The security agents, as built by the agent deployer, may be configured to query for sensor data from given sensors, to determine which trigger events to utilize for querying sensor data, what anomaly detection may be performed on the devices in question and what anomaly detection is to be performed at the remote system, a rate of sensor data querying and/or anomaly detection, etc. Data representing the security agent may be sent to the device in question for installation on the device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for anomaly detection in workspaces. The system 100 may include, for example, one or more devices 102, which may be described generally as electronic devices 102 and may include a communal device and/or a personal device. In certain examples, the devices 102 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The devices 102 may be configured to send data to and/or receive data from a remote system 104, such as via a network 106. It should be understood that where operations are described herein as being performed by the remote system 104, some or all of those operations may be performed by the device 102. It should also be understood that anytime the remote system 104 is referenced, that system may include any system and/or device, whether local to an environment of the devices 102 or remote from that environment. Additionally, it should be understood that a given space and/or environment may include numerous electronic devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, one or more speakers 116, one or more displays 118, and/or one or more sensors 120. The microphones 114 may be configured to capture audio, such as user utterances, and generate corresponding audio data. The speakers 116 may be configured to output audio, such as audio corresponding to audio data received from another device and/or the system 104. The displays 118 may be configured to display images corresponding to image data, such as image data received from the remote system 104 and/or one or more other devices. The sensors 120 may include any component configured to detect an environmental condition associated with the devices 102 and/or the environment associated with the devices 102. Some example sensors 120 may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the device, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 120, usage data and/or account data may be utilized to determine if an environmental condition is present and/or is likely to be present that indicates the environment associated with the device 102 is unsecure for accessing sensitive data, as described more fully herein. The memory 112 of the devices 102 may include a security agent 122. The security agent will be described in more detail below by way of example.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote system 104 may include components such as, for example, a user registry 124, a data store 126, a data preprocessor 128, an anomaly detector 130, a contextual data component 132, an analytics component 134, one or more dashboards 136, an action component 138, and/or an agent deployer 140. The remote system 104 may also include components that are not specifically illustrated in FIG. 1. For example, the remote system 104 may include a speech-processing system. It should be understood that while the components of the remote system 104 are depicted and/or described as separate from each other in FIG. 1, some or all of the components may be apart of the same system. The speech-processing system may include an automatic speech recognition component (ASR) and/or a natural language understanding component (NLU). Each of the components described herein with respect to the remote system 104 may be associated with their own systems, which collectively may be referred to herein as the remote system 104, and/or some or all of the components may be associated with a single system. Additionally, the remote system 104 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the remote system 104 and the security agent 122 of the devices 102 are described in detail below. In examples, some or each of the components of the remote system 104 may include their own processor(s), network interface(s), and/or memory. As such, by way of example, the anomaly detector may include and/or be associated with processor(s), network interface(s), and/or memory. The other components of the remote system 104, such as the action component 138, may include and/or be associated with different processor(s), network interface(s), and/or memory, or one or more of these components may utilize some or all of the same processor(s), network interface(s), and/or memory utilized by the anomaly detector 130. These components are described in detail below. Additionally, the operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the components of the memory 112 of the devices 102 and/or the remote system 104, the user registry 124 may be configured to determine and/or generate associations between users, user accounts, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the devices 102. The user registry 124 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system may be configured to receive audio data from the devices 102 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "access Data A," the NLU component may identify an "access data" intent and the payload may be "Data A." In this example where the intent data indicates an intent to display content associated with Data A, the speech-processing system may call one or more speechlets to effectuate the intent. Speechlets, as described herein may otherwise be described as applications and may include functionality for utilizing intent data to generate directives and/or instructions. For example, a customer service speechlet may be called when the intent indicates that Data A is to be utilized for customer troubleshooting. The speechlet may be designated as being configured to handle the intent of identifying and providing Data A, for example. The speechlet may receive the intent data and/or other data associated with the user utterance from the NLU component, such as by an orchestrator of the remote system 104, and may perform operations to instruct the devices 102 to output the content, for example. The remote system 104 may generate audio data confirming that requested content has been provided, such as by a text-to-speech component. The data may be sent from the remote system 104 to the devices 102.

The components of the system 100 are described below by way of example. Generally, individuals that are provided access to sensitive data work with the sensitive data in a secure physical environment, such as a specific room and/or building that is designated for accessing and utilizing the sensitive data. However, utilizing a specifically-designated physical space to allow users to access and utilize sensitive data may not be available in many circumstances. Maintaining adherence to policies that prevent or otherwise hinder improper use of sensitive data is still preferred in these scenarios. To assist in adherence to such policies, techniques described herein allow for anomaly detection in workspaces. For example, users who are authorized to access and utilize sensitive data may be associated with a computing device 102. The computing device 102 may correspond to a device identifier that is associated with user profile data for the user. The user registry 124 may store the user profile data indicating the device identifier and sensitive data access authorizations. The sensitive data access authorizations may indicate what sensitive data the user is authorized to access, and/or one or more functions that are authorized to be performed by the user, such as how the sensitive data is authorized to be accessed and utilized. These users may utilize the devices 102 in environments that are not specifically designated as a physical space for sensitive data access, such as user homes, for example. The devices 102 may have installed thereon the security agent 122, which may be a component configured to query the one or more sensors 120 of the device 102, and/or sensors 120 that are otherwise associated with the device 102, for sensor data, and in examples to utilize the sensor data to detect anomalies.

The security agent 122 may be installed on the device 102 and/or may otherwise be accessible by the device 102. The security agent 122 may be configured to determine when to query the one or more sensors 120 associated with the device 102 and/or to determine how to process the sensor data received from the sensors 120. For example, the security agent 122 may be configured to query the sensors 120 when the security agent 122 receives an indication that a triggering event has occurred. Example triggering events may include when the device 102 is in an "on" state, when the device 102 is connected to a wireless access point, when one or more applications associated with sensitive data access are running on the device 102, when sensitive data is being displayed on a display 118 of the device 102, when the device 102 requests sensitive data such as from the remote system 104, when the user attempts to perform one or more actions associated with the sensitive data, upon the occurrence of a scheduled and/or periodic time and/or event occurring, upon receiving a request to perform anomaly detection such as from another device and/or the remote system 104, and/or one or more other triggering events associated with the access and/or usage of the sensitive data. The sensors 120 may then generate sensor data and provide the sensor data to the security agent 122. In some examples, the security agent 122 may be configured to receive the sensor data and send the sensor data to the remote system 104 for further processing and anomaly detection. In these examples, the sensor data may be encrypted and/or otherwise formatted to hinder nefarious actors accessing the sensor data. Additionally, or alternatively, the security agent 122 may be configured to perform some or all of the anomaly detection operations described in more detail herein.

In examples where the security agent 122 sends the sensor data to the remote system 104, the data store 126 may be configured to receive the sensor data from the device 102. The data 126 store may store the sensitive data prior to processing for anomaly detection and/or the data store 126 may provide information to the data preprocessor 128. The information may indicate a data type of the sensor data and/or one or more other attributes of the sensor data, such as which device identifier is associated with the sensor data, which user profile data is associated with the sensor data, time information associated with the sensor data, an identifier of the sensitive data that is being accessed when the sensor data was received, and/or any other information associated with the sensor data. The data store 126 may then provide the sensor data to the data preprocessor 128, such as in response to a query for the sensor data from the data preprocessor 128 and/or without receiving a specific request for the sensor data. It should be understood that the security agent 122 may process some or all of the sensor data described herein, such as for anomaly detection. For example, when the sensor data includes biometric data, such as of a fingerprint, that biometric data may be analyzed locally on the device 102. In examples, the security agent 122 may selectively send data to the remote system 104 for processing.

The data preprocessor 128 may be configured to receive the sensor data and preprocess the sensor data into a format that is acceptable as input to the anomaly detector 130. For example, the anomaly detector 130 may be configured as a given model, such as a machine learning model. Based at least in part on the type of model, the data preprocessor 128 may preprocess the sensor data into a format that is usable by the anomaly detector 130. The data preprocessor 128 may also be configured to query and receive contextual data associated with the sensor data for use by the anomaly detector 130. For example, the data preprocessor 128 may have access to the contextual data component 132 that is configured to store and/or access contextual data that may be utilized for anomaly detection. Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device 102, device capabilities associated with the auxiliary devices, sensitive data authorization information, peer data usage information, historical sensitive data usage information, and/or any other information associated with the sensor data and/or usage of the sensitive data. The data preprocessor 128 may be configured to determine what contextual information to request from the contextual data component 132 based at least in part on the type of sensor data that is received from the security agent 122 and/or based at least in part on the user profile data associated with access of the sensitive data. For example, when the sensor data is audio data, the data preprocessor 128 may be configured to query the contextual data component 132 for reference audio data and/or audio signatures associated with the user profile data. In this way, sample audio data from the environment may be compared to the reference audio data to determine if the sample audio data indicates an anomaly. By way of further example, sample image data may be compared to reference image data to determine if the sample image data indicates an anomaly. Additional examples of contextual data usage for anomaly detection purposes are described below with respect to the anomaly detector 130.

The anomaly detector 130 may be configured to receive input data from the data preprocessor 128 and to utilize the received data to detect one or more anomalies associated with the environment in which the device 102 is situated and/or in the usage of the sensitive data by the user. In examples, the anomaly detector 130 may include a model configured to apply one or more heuristics for detecting anomalies and the anomaly detector 130 may utilize one or more types of the sensor data described herein to detect anomalies. For example, when the sensor data is audio data, the anomaly detector 130 may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector 130 may determine that an anomaly is present, here the possibility of an unauthorized user being in the environment. By way of further example, when the sensor data is image data, the anomaly detector 130 may be configured to determine whether the image data depicts more than one person in the environment. In instances where more than one person is depicted, particularly when the contextual data indicates that only one user is authorized to access sensitive data by the device in question, the anomaly detector 130 may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector 130 may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector 130 may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector 130 to determine whether an anomaly is present. These network-based anomalies may include, for example, an indication that the device 102 is connected to a publicly-accessible network, that the device 102 is located in a public place where other individuals may view the display of the device 102, that the device 102 is located in a geographic location that is not affiliated with the user, that the device 102 is in motion such as on a bus or other unsecure environment, etc.

In still other examples, when the sensor data is device connectivity data, the anomaly detector 130 may be configured to determine whether the devices connected to the device 102 in question indicates an unsecure environmental condition. For example, a device type of a connected auxiliary device may indicate the capabilities of the auxiliary device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device 102 may typically have a certain number of connected auxiliary devices associated with it and/or the identifiers of the typical connected auxiliary devices may be known. When the sensor data indicates an increase in the number of connected auxiliary devices and/or indicates a previously-unidentified connected auxiliary device, such an indication may correspond to an anomaly. In general, the anomaly detector 130 may be configured to receive, as input, sensor data indicating one or more attributes of an environment in which the device 102 is situated and/or one or more conditions of the device 102 and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc. It should also be understood that time-related data may indicate an anomaly. For example, the accessing of sensitive data at times and/or one days that differ from when sensitive data is typically accessed by the individual and/or a peer group may indicate a potential anomaly.

In examples where an anomaly is detected by the anomaly detector 130, one or more actions may be taken based at least in part on the anomaly that is detected. For example, an indicator of the anomaly may be sent from the anomaly detector 130 to the action component 138. The action component 138 may be configured to determine an action to be performed based at least in part on the anomaly. The actions may include, for example, sending a notification of the anomaly to the device 102, sending a notification to another device such as a device associated with a manager, restricting access to the sensitive data, ceasing authorization to the sensitive data by the user, causing the sensitive data to be prevented from being displayed, locking the device 102, causing the device 102 to shut down, and/or one or more other actions. To do so, particularly when the action includes the device 102 performing one or more operations, a command to perform the action may be sent to the security agent 122 of the device 102 and the security agent 122 may cause the device 102 to perform the action. In examples, a user of the device 102 may be able to provide user input to negate or otherwise comment on the detected anomaly. For example, the action may be to notify the user of a potential anomaly and the user may provide user input to confirm or deny the presence of the anomaly. Additionally, even in examples where the action includes shutting down the device 102, locking the device 102, and/or restricting sensitive data access, the user may be able to provide user input that may indicate that the anomaly has been mitigated and the environment is now secure.

In at least some examples, the detected anomaly may be of a specific type and/or may be associated with a given risk type and the anomaly type and/or risk type may indicate the action to be performed. In examples where the risk type and/or anomaly type indicates a less severe policy violation than in other examples, the anomaly detector 130 may send an indication of the detected anomaly to the one or more dashboards 136 configured to display detected anomalies. It should be understood that indications of detected anomalies may be provided to the dashboards 136 regardless of severity, in examples. The dashboards 136 may be accessible to managers and/or other personnel associated with the remote system 104, and the dashboards 136 may be configured to receive user input associated with the anomalies. For example, a manager may provide user input indicating that the detected anomaly is problematic or not, and that user input may be utilized to determine an action to be performed. The dashboards 136 may also provide historical information about detected anomalies, including anomalies associated with given user profile data, given devices, given sensitive data, etc. This information may be acted on by the device users and/or the managers for performing actions as described herein.

In addition to the use of sensor data as described herein, the anomaly detector 130 may be configured to utilize sensitive data usage information to detect anomalies. For example, as users access and utilize sensitive data, usage data representing that usage may be stored and analyzed to determine if usage at a given time corresponds to the historical usage. For example, if the historical usage data indicates that only given sensitive data is historically accessed, and/or that certain quantities of sensitive data are historically accessed, and/or that the sensitive data is historically accessed for certain periods of time, and/or that the sensitive data is utilized in only certain ways, then when data access and/or usage deviates from this historical data usage, such as by at least a threshold amount, then an anomaly may be detected. Additional data such as user input cadences and/or user input types may be utilized. For example, the way a given user provides user input, such as typing, mouse usage, etc. may be utilized to determine if a deviation is present and thus an anomaly. In addition to the above, peer evaluation of sensitive data usage may be utilized by the anomaly detector 130 to detect anomalies. For example, the user may be associated with a peer group that is authorized to utilize certain sensitive data and/or to utilize the data in certain ways. When an individual user of the peer group is utilizing different data from that used by the group and/or when the data usage differs from usage by the group, such indications may represent an anomaly detected by the anomaly detector 130. The anomaly detector 130 may be configured to utilize some or all of the input signals described herein to detect anomalies and/or to determine confidence values associated with detection of anomalies.

It should be understood that prior to any sensor data being collected or utilized as described herein, the users of the devices may be made aware of the sensor data collection and users may provide authorization for such use. Such a notification may be provided when the user is provided access to the sensitive data, when the user turns on the device, when the user accesses given programs, or otherwise. Additionally, for certain types of sensor data, such as image data, specific authorization may be requested and received from users before that data is sent from the device to another device or system.

Additionally, the analytics component 134 may receive the sensor data, contextual data, and/or indications of detected anomalies as described herein. The analytics component 134 may be configured to utilize the data it receives to determine one or more improvements to how the security agent 122 detects anomalies and/or gathers sensor data. For example, the analytics component 134 may indicate the types of sensor data typically involved in detected anomalies, specific anomalies that have been detected, frequency of detected anomalies, etc. This information may be utilized by the analytics component 134 to determine how the security agent 122 should query for sensor data. The agent deployer 140 may receive this information from the analytics component 134 and utilize the information to build the security agents 122 described herein. The security agents 122, as built by the agent deployer 140, may be configured to query for sensor data from given sensors 120, to determine which trigger events to utilize for querying sensor data, what anomaly detection may be performed on the devices 102 and what anomaly detection is to be performed at the remote system 104, a frequency of sensor data querying and/or anomaly detection, etc. Data representing the security agent 122 may be sent to the device 102 for installation on the device 102.

The machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

It should be noted that while text data is described as a type of data utilized to communicate between various components of the remote system 104 and/or other systems and/or devices, the components of the remote system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 104 and the associated functionality of those components as described herein may be performed by one or more of the devices 102. Additionally, or alternatively, some or all of the components and/or functionalities associated with the devices 102 may be performed by the remote system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the remote system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the remote system 104 may possess its own local memory, which also may store program components, program data, and/or one or more operating systems.

The memory 112 and/or the memory described with respect to the components of the remote system 104 may include volatile and nonvolatile memory, removable and non-removable media implemented in any method or technology for storage of information, such as computer-readable instructions, data structures, program component, or other data. Such memory 112 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the remote system 104 may be implemented as computer-readable storage media ("CRSM"), which may be any available physical media accessible by the processor(s) 108 and/or the processor(s) described with respect to the remote system 104 to execute instructions stored on the memory 112 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the remote system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA;

LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the remote system 104 may enable messages between the components and/or devices shown in system 100 and/or with one or more other polling systems, as well as other networked devices. Such network interface(s) 110 and/or the network interface(s) described with respect to the components of the remote system 106 may include one or more network interface controllers (NICs) or other types of transceiver devices to send and receive messages over the network 106.

For instance, each of the network interface(s) 110 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the remote system 104 may include a wide area network (WAN) component to enable message over a wide area network.

In some instances, the remote system 104 may be local to an environment associated the devices 102. For instance, the remote system 104 may be located within one or more of the devices 102. In some instances, some or all of the functionality of the remote system 104 may be performed by one or more of the devices 102. Also, while various components of the remote system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
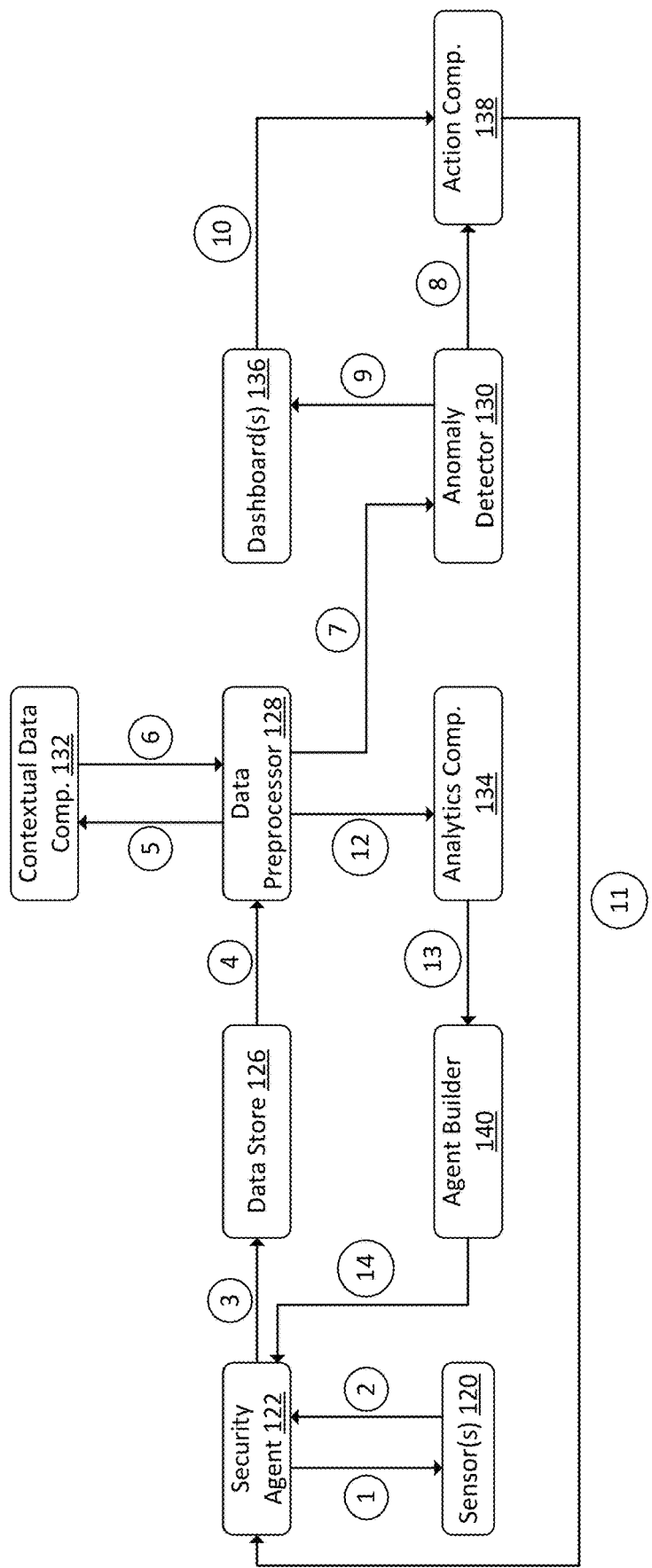
FIG. 2 illustrates a conceptual diagram of data and components utilized for anomaly detection in workspaces.

FIG. 2 illustrates a conceptual diagram of data and components utilized for anomaly detection in workspaces. The components illustrated in FIG. 2 may include the same or similar components described with respect to FIG. 1. For example, the components may include one or more sensors 120, a security agent 122, a data store 126, a data preprocessor 128, an anomaly detector 130, a contextual data component 132, an analytics component 134, one or more dashboards 136, an action component 138, and/or an agent deployer 140. Additionally, the use of these components is described with respect to steps 1-14 in FIG. 2. It should be understood that these steps may be performed sequentially, in parallel, and/or in a different order than is presented in FIG. 2.

At step 1, the security agent 122 may query the sensors 120 for sensor data. The security agent 122 may be configured to determine when to query the one or more sensors 120 associated with the device and/or to determine how to process the sensor data received from the sensors 120. For example, the security agent 122 may be configured to query the sensors 120 when the security agent 122 receives an indication that a triggering event has occurred. Example triggering events may include when the device is in an "on" state, when the device is connected to a wireless access point, when one or more applications associated with sensitive data access are running on the device, when sensitive data is being displayed on a display of the device, when the device requests sensitive data such as from the remote system, when the user attempts to perform one or more actions associated with the sensitive data, upon the occurrence of a scheduled and/or periodic time and/or event occurring, upon receiving a request to perform anomaly detection such as from another device and/or the remote system, and/or one or more other triggering events associated with the access and/or usage of the sensitive data. In examples, the security agent 122 may be configured to identify a current user of the device prior to sensor data transmission to the remote system 104 or other anomaly detection. By so doing, the security agent 122 may confirm that the current user is an authorized user prior to the sensitive data being accessed. Doing so may include comparing device certificate to authorized certificates to ensure the device is authorized to access sensitive data and by comparing user certificates to authorized user certificates. It should also be understood that when security agents 122 are described herein, those security agents 122 may be a pre-installed component of the device 102 in question, and the use of such security agents 122 for sensor data collection and/or anomaly detection may include instructing the security agents 122 to perform the operations described herein.

At step 2, the sensors 120 may then generate sensor data and provide the sensor data to the security agent 122. In some examples, the security agent 122 may be configured to receive the sensor data and send the sensor data to the remote system for further processing and anomaly detection. In these examples, the sensor data may be encrypted and/or otherwise formatted to hinder nefarious actors accessing the sensor data. Additionally, or alternatively, the security agent 122 may be configured to perform some or all of the anomaly detection operations described in more detail herein.

At step 3, the security agent 122 may send the sensor data to the data store 126. The data store 126 may be configured to receive the sensor data from the device. The data store 126 store may store the sensitive data prior to processing for anomaly detection and/or the data store 126 may provide information to the data preprocessor 128. The information may indicate a data type of the sensor data and/or one or more other attributes of the sensor data, such as which device identifier is associated with the sensor data, which user profile data is associated with the sensor data, time information associated with the sensor data, an identifier of the sensitive data that is being accessed when the sensor data was received, and/or any other information associated with the sensor data.

At step 4, the data store 126 may provide the sensor data to the data preprocessor 128, such as in response to a query for the sensor data from the data preprocessor 128 and/or without receiving a specific request for the sensor data. The data preprocessor 128 may be configured to receive the sensor data and preprocess the sensor data into a format that is acceptable as input to the anomaly detector 130. For example, the anomaly detector 130 may be configured as a given model, such as a machine learning model. Based at least in part on the type of model, the data preprocessor 128 may preprocess the sensor data into a format that is usable by the anomaly detector 130.

At step 5, the data preprocessor 128 may also be configured to query and receive contextual data associated with the sensor data for use by the anomaly detector 130. For example, the data preprocessor 128 may have access to the contextual data component 132 that is configured to store and/or access contextual data that may be utilized for anomaly detection. Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device, device capabilities associated with the auxiliary devices, sensitive data authorization information, peer data usage information, historical sensitive data usage information, and/or any other information associated with the sensor data and/or usage of the sensitive data. The data preprocessor 128 may be configured to determine what contextual information to request from the contextual data component 132 based at least in part on the type of sensor data that is received from the security agent 122 and/or based at least in part on the user profile data associated with access of the sensitive data. For example, when the sensor data is audio data, the data preprocessor 128 may be configured to query the contextual data component 132 for reference audio data and/or audio signatures associated with the user profile data. In this way, sample audio data from the environment may be compared to the reference audio data to determine if the sample audio data indicates an anomaly. By way of further example, sample image data may be compared to reference image data to determine if the sample image data indicates an anomaly. Additional examples of contextual data usage for anomaly detection purposes are described below with respect to the anomaly detector. At step 6, the contextual data component 132 may provide the requested contextual data to the data preprocessor 128.

At step 7, the data preprocessor 128 may provide the sensor data, as formatted, and the contextual data to the anomaly detector 130. The anomaly detector 130 may be configured to receive input data from the data preprocessor 128 and to utilize the received data to detect one or more anomalies associated with the environment in which the device is situated and/or in the usage of the sensitive data by the user. In examples, the anomaly detector 130 may include a model configured to apply one or more heuristics for detecting anomalies and the anomaly detector 130 may utilize one or more types of the sensor data described herein to detect anomalies. For example, when the sensor data is audio data, the anomaly detector 130 may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector 130 may determine that an anomaly is present, here the possibility of an unauthorized user being in the environment. By way of further example, when the sensor data is image data, the anomaly detector 130 may be configured to determine whether the image data depicts more than one person in the environment. In instances where more than one person is depicted, particularly when the contextual data indicates that only one user is authorized to access sensitive data by the device in question, the anomaly detector 130 may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector 130 may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector 130 may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector 130 to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector 130 may be configured to determine whether the devices connected to the device in question indicates an unsecure environmental condition. For example, a device type of a connected auxiliary device may indicate the capabilities of the auxiliary device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary devices and/or indicates a previously-unidentified connected auxiliary device, such an indication may correspond to an anomaly. In general, the anomaly detector 130 may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

At step 8, an indicator of the anomaly may be sent from the anomaly detector 130 to the action component 138. The action component 138 may be configured to determine an action to be performed based at least in part on the anomaly. The actions may include, for example, sending a notification of the anomaly to the device, sending a notification to another device such as a device associated with a manager, restricting access to the sensitive data, ceasing authorization to the sensitive data by the user, causing the sensitive data to be prevented from being displayed, locking the device, causing the device to shut down, and/or one or more other actions. To do so, particularly when the action includes the device performing one or more operations, at step 11, command to perform the action may be sent to the security agent 122 of the device and the security agent 122 may cause the device to perform the action.

In at least some examples, the detected anomaly may be of a specific type and/or may be associated with a given risk type and the anomaly type and/or risk type may indicate the action to be performed. In examples where the risk type and/or anomaly type indicates a less severe policy violation than in other examples, at step 9, the anomaly detector 130 may send an indication of the detected anomaly to the one or more dashboards 136 configured to display detected anomalies. It should be understood that indications of detected anomalies may be provided to the dashboards 136 regardless of severity, in examples. The dashboards 136 may be accessible to managers and/or other personnel associated with the remote system 104, and the dashboards 136 may be configured to receive user input associated with the anomalies. For example, a manager may, at step 10, provide user input indicating that the detected anomaly is problematic or not, and that user input may be utilized to determine an action to be performed. The dashboards 136 may also provide historical information about detected anomalies, including anomalies associated with given user profile data, given devices, given sensitive data, etc. This information may be acted on by the device users and/or the managers for performing actions as described herein.

In addition to the use of sensor data as described herein, the anomaly detector 130 may be configured to utilize sensitive data usage information to detect anomalies. For example, as users access and utilize sensitive data, usage data representing that usage may be stored and analyzed to determine if usage at a given time corresponds to the historical usage. For example, if the historical usage data indicates that only given sensitive data is historically accessed, and/or that certain quantities of sensitive data are historically accessed, and/or that the sensitive data is historically accessed for certain periods of time, and/or that the sensitive data is utilized in only certain ways, then when data access and/or usage deviates from this historical data usage, such as by at least a threshold amount, then an anomaly may be detected. Additional data such as user input cadences and/or user input types may be utilized. For example, the way a given user provides user input, such as typing, mouse usage, etc. may be utilized to determine if a deviation is present and thus an anomaly. In addition to the above, peer evaluation of sensitive data usage may be utilized by the anomaly detector 130 to detect anomalies. For example, the user may be associated with a peer group that is authorized to utilize certain sensitive data and/or to utilize the data in certain ways. When an individual user of the peer group is utilizing different data from that used by the group and/or when the data usage differs from usage by the group, such indications may represent an anomaly detected by the anomaly detector 130. The anomaly detector 130 may be configured to utilize some or all of the input signals described herein to detect anomalies and/or to determine confidence values associated with detection of anomalies.

It should be understood that prior to any sensor data being collected or utilized as described herein, the users of the devices may be made aware of the sensor data collection and users may provide authorization for such use. Such a notification may be provided when the user is provided access to the sensitive data, when the user turns on the device, when the user accesses given programs, or otherwise. Additionally, for certain types of sensor data, such as image data, specific authorization may be requested and received from users before that data is sent from the device to another device or system.

At step 12, the analytics component 134 may receive the sensor data, contextual data, and/or indications of detected anomalies as described herein. The analytics component 134 may be configured to utilize the data it receives to determine one or more improvements to how the security agent 122 detects anomalies and/or gathers sensor data. For example, the analytics component 134 may indicate the types of sensor data typically involved in detected anomalies, specific anomalies that have been detected, frequency of detected anomalies, etc. This information may be utilized by the analytics component 134 to determine how the security agent 122 should query for sensor data.

At step 13, the agent deployer 140 may receive this information from the analytics component 134 and utilize the information to build the security agents 122 described herein. The security agents 122, as built by the agent deployer 140, may be configured to query for sensor data from given sensors 120, to determine which trigger events to utilize for querying sensor data, what anomaly detection may be performed on the devices and what anomaly detection is to be performed at the remote system 104, a frequency of sensor data querying and/or anomaly detection, etc.

At step 14, data representing the security agent 122 may be sent to the device for installation on the device.

Figure 3:
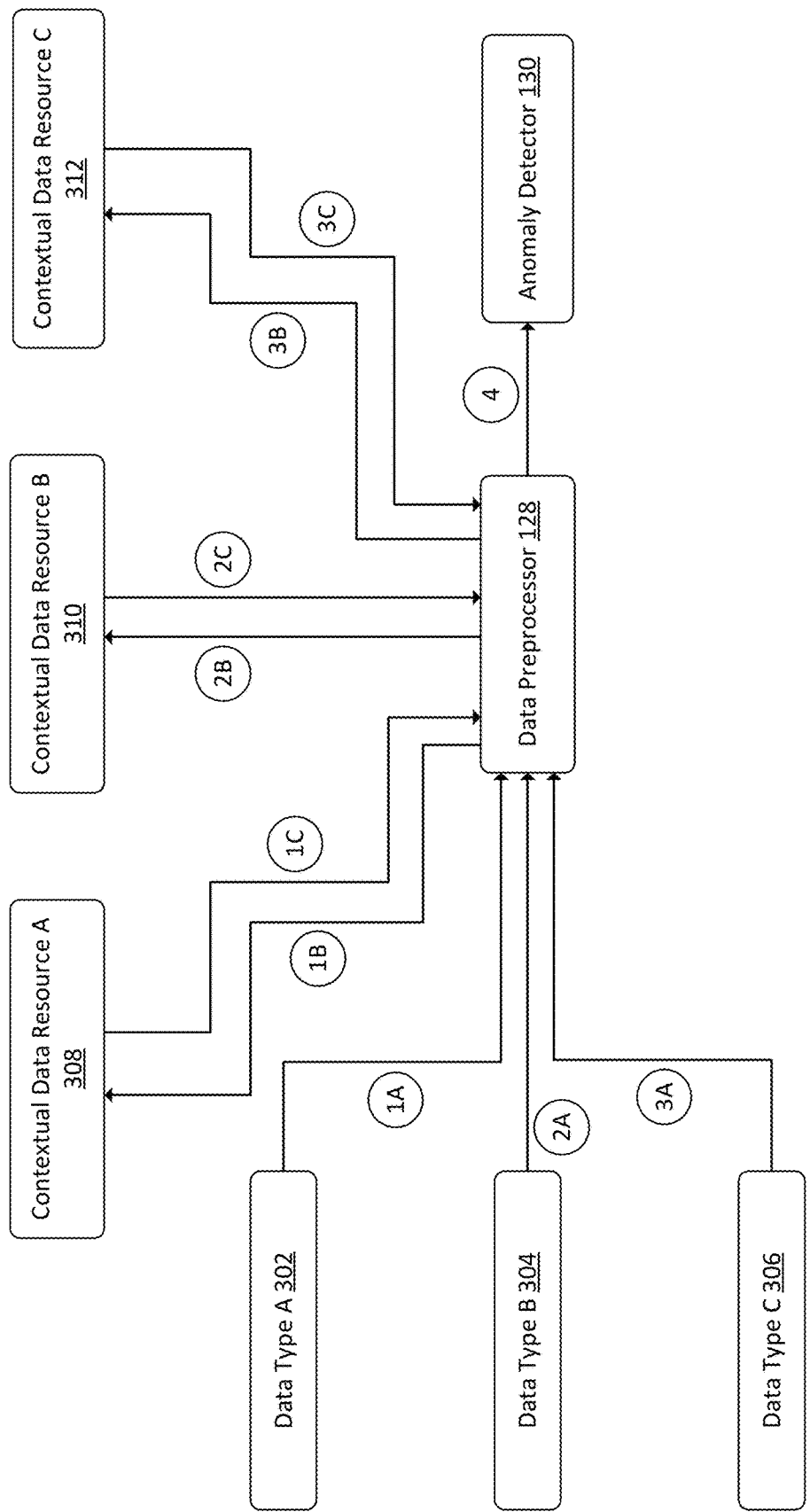
FIG. 3 illustrates a conceptual diagram of sensor data and contextual data utilized for anomaly detection in workspaces.

FIG. 3 illustrates a conceptual diagram of sensor data and contextual data utilized for anomaly detection in workspaces. FIG. 3 may include some of the same or similar components as described with respect to FIG. 1. For example, FIG. 3 may include a data preprocessor 128 and/or an anomaly detector 130. Additionally, the flow of data as described with respect to FIG. 3 is described in steps 1A-4, 2A-4, and 3A-4. It should be understood that additional or different steps may be performed and/or the steps may be performed in a different order than that presented in FIG. 3.

FIG. 3 illustrates the receipt of various sensor data types 302-306 and the use of various contextual data resources 308-312 by the data preprocessor 128 to provide input data to the anomaly detector 130 for detecting anomalies. For example, FIG. 3 illustrates three different sensor data types, Data Type A 302, Data Type B 304, and Data Type C 306. It should be understood that one, two, three, or more than three data types may be received by the data preprocessor 128. These data types may correspond to types of sensor data received from sensors, as described herein. For example, the data types may include sensor data received from one or more sensors. The sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the device, Bluetooth and/or other short-range communication components configured to determine what devices are wirelessly connected to the device, device-connection sensors configured to determine what devices are physically connected to the device, and/or one or more other sensors configured to detect a physical condition of the device and/or the environment in which the device is situated.

The data preprocessor may be configured to receive, at steps 1A, 2A, and 3A, the sensor data and preprocess the sensor data into a format that is acceptable as input to an anomaly detector. The data preprocessor may also be configured to query, at steps 1B, 2B, and 3B, and receive, at steps 1C, 2C, and 3C, contextual data associated with the sensor data for use by the anomaly detector. For example, the data preprocessor 128 may have access to a contextual data component that is configured to store and/or access contextual data that may be utilized for anomaly detection from one of more contextual data resources. Using FIG. 3 as an example, the resources may include Contextual Data Resource A 308, Contextual Data Resource B 310, and Contextual Data Resource C 312. It should be understood that one, two, three, or more than three contextual data resources may be queried. Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device, device capabilities associated with the auxiliary devices, sensitive data authorization information, peer data usage information, historical sensitive data usage information, and/or any other information associated with the sensor data and/or usage of the sensitive data.

The data preprocessor 128 may be configured to determine what contextual information to request from the contextual data component based at least in part on the type of sensor data that is received from the security agent and/or based at least in part on the user profile data associated with access of the sensitive data. For example, if the sensor data is associated with Data Type A, such as audio data, the data preprocessor 128 may be configured to query the contextual data component for reference audio data and/or audio signatures associated with the user profile data, which may be associated with Contextual Data Resource A 308. In this way, sample audio data from the environment may be compared to the reference audio data to determine if the sample audio data indicates an anomaly. By way of further example, sample image data may be associated with Data Type B, and the data preprocessor 128 may be configured to query Contextual Data Resource B 310 that is associated with reference image data. Sensor data corresponding to Data Type C 306 may be data that is a different data type than audio data or image data, and that data type may be utilized by the data preprocessor 128 to determine that the contextual data is to be queried from Contextual Data Resource C 312.

Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device, device capabilities associated with the auxiliary devices, sensitive data authorization information, peer data usage information, historical sensitive data usage information, and/or any other information associated with the sensor data and/or usage of the sensitive data.

At step 4, the data preprocessor 128 may provide the sensor data, as formatted, and the contextual data to the anomaly detector 130. The anomaly detector 130 may be configured to receive input data from the data preprocessor 128 and to utilize the received data to detect one or more anomalies associated with the environment in which the device is situated and/or in the usage of the sensitive data by the user. In examples, the anomaly detector 130 may include a model configured to apply one or more heuristics for detecting anomalies and the anomaly detector 130 may utilize one or more types of the sensor data described herein to detect anomalies. For example, when the sensor data is audio data, the anomaly detector 130 may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector 130 may determine that an anomaly is present, here the possibility of an unauthorized user being in the environment. By way of further example, when the sensor data is image data, the anomaly detector 130 may be configured to determine whether the image data depicts more than one person in the environment. In instances where more than one person is depicted, particularly when the contextual data indicates that only one user is authorized to access sensitive data by the device in question, the anomaly detector 130 may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector 130 may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector 130 may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector 130 to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector 130 may be configured to determine whether the devices connected to the device in question indicates an unsecure environmental condition. For example, a device type of a connected auxiliary device may indicate the capabilities of the auxiliary device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary devices and/or indicates a previously-unidentified connected auxiliary device, such an indication may correspond to an anomaly. In general, the anomaly detector 130 may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

Figure 4:
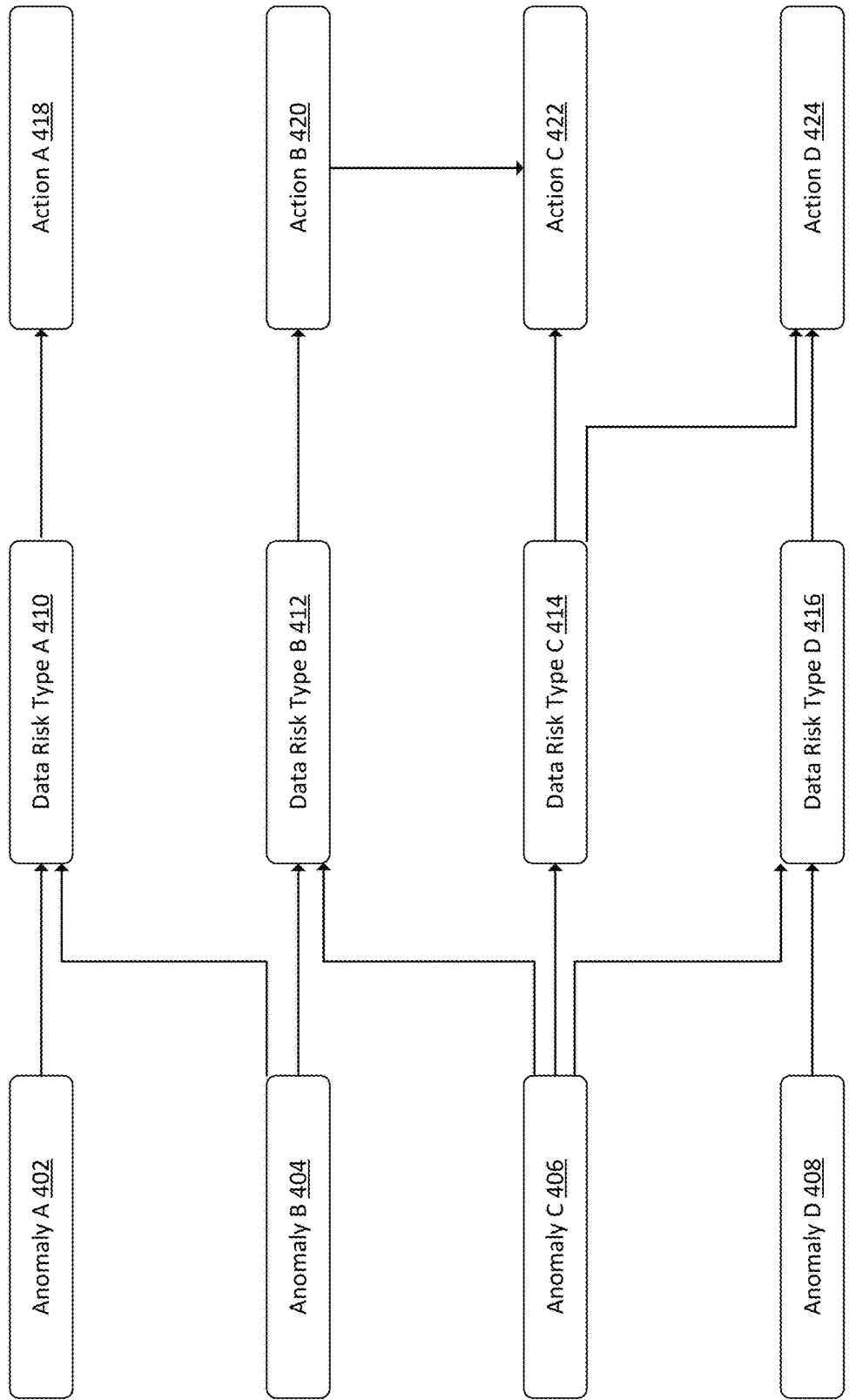
FIG. 4 illustrates a conceptual diagram of actions taken in association with various detected anomalies and associated risk types.

FIG. 4 illustrates a conceptual diagram of actions taken in association with various detected anomalies and associated risk types. For example, sensor data and contextual data may be utilized as described herein to detect anomalies in workspaces. Given anomalies may be associated with given data risk types and/or actions to be taken when the anomalies are detected. As shown in FIG. 4, one or more anomalies may be detected, such as Anomaly A 402, Anomaly B 404, Anomaly C 406, and/or Anomaly D 408. Additionally, various data risk types may be associated with policies for securing sensitive data, such as Data Risk Type A 410, Data Risk Type B 412, Data Risk Type C 414, and/or Data Risk Type D 416. Additionally, various actions may be caused to be performed when given anomalies are detected and/or when a given anomaly is associated with given data risk types, such as Action A 418, Action B 420, Action C 422, and/or Action D 424.

Example anomaly types are described throughout this disclosure. With respect to data risk types, those risk types may include, for example, the risk of a worker outsourcing responsibilities associated with access of sensitive data to another person, the risk of the device displaying or otherwise outputting sensitive data in a public place, the risk of sensitive data being recorded or otherwise duplicated without consent, the risk of exposing personal information associated with customers, including customers that may be described as celebrities, the risk of nefarious data usage when the device is disconnected from a network or is otherwise offline, the risk of a hazardous or unwanted auxiliary device being connected to the device in question, and/or the risk of a worker causing further sensitive data risk when attempting to mitigate unsecure data usage.

As shown in FIG. 4, an action component may be configured to determine what action to taken based at least in part on the anomaly that was detected and the data risk type involved with the anomaly. For example, detection of Anomaly A 402 may be associated with only a single data risk type, such as Data Risk Type A 410. By way of example, Anomaly A 402 may be detection of an unpermitted user of the device accessing the sensitive information. This may be associated with a data risk type of outsourcing of functions performed by the permitted user. In these examples, Action A 418 may be performed, such as locking the device down or otherwise preventing further access to the sensitive data.

In other examples, such as when Anomaly B 404 is detected, the anomaly may be associated with multiple data risk types, such as Data Risk Type A 410 and Data risk Type B 412. In these examples, the action component may be configured to determine what data risk type is present and may perform an action based at least in part on the determined data risk type. For example, if Data Risk Type A 410 is determined to be present, then Action A 418 may be performed. If Data Risk Type b 412 is determined to be present, then Action B 420 may be performed. In some examples, both Action A 418 and Action B may be taken.

In other examples, such as when Anomaly C 406 is detected, the anomaly may be associated with three or more data risk types. In these examples, the action component may be configured to determine what data risk types are present and take corresponding actions. In some examples, determination that a given data risk type is present, such as Data Risk Type C 414, may result in multiple actions being performed. For example, Action C 414 and/or Action D 416 may be performed. The determination of which action to perform, and/or the determination to perform both actions, may be based at least in part on the anomaly that was detected, historical anomaly detection data, the user profile data associated with the anomaly, peer group usage data, the sensitive data at issue, and/or one or more other factors.

In still other examples, the performance of a given action may be followed by the performance of another action. As shown in FIG. 4, Action B 420 may be performed, such as notifying a manager of the detected anomaly, and then Action C 422 may be performed, which may be based at least in part on user input data received from a device of the manager and/or based at least in part on other information associated with the anomaly, such as historical anomaly detection data.

FIGS. 5-9 illustrates processes for anomaly detection in workspaces. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 10, and 11, although the processes may be implemented in a wide variety of other environments, architectures and systems.

Figure 5:
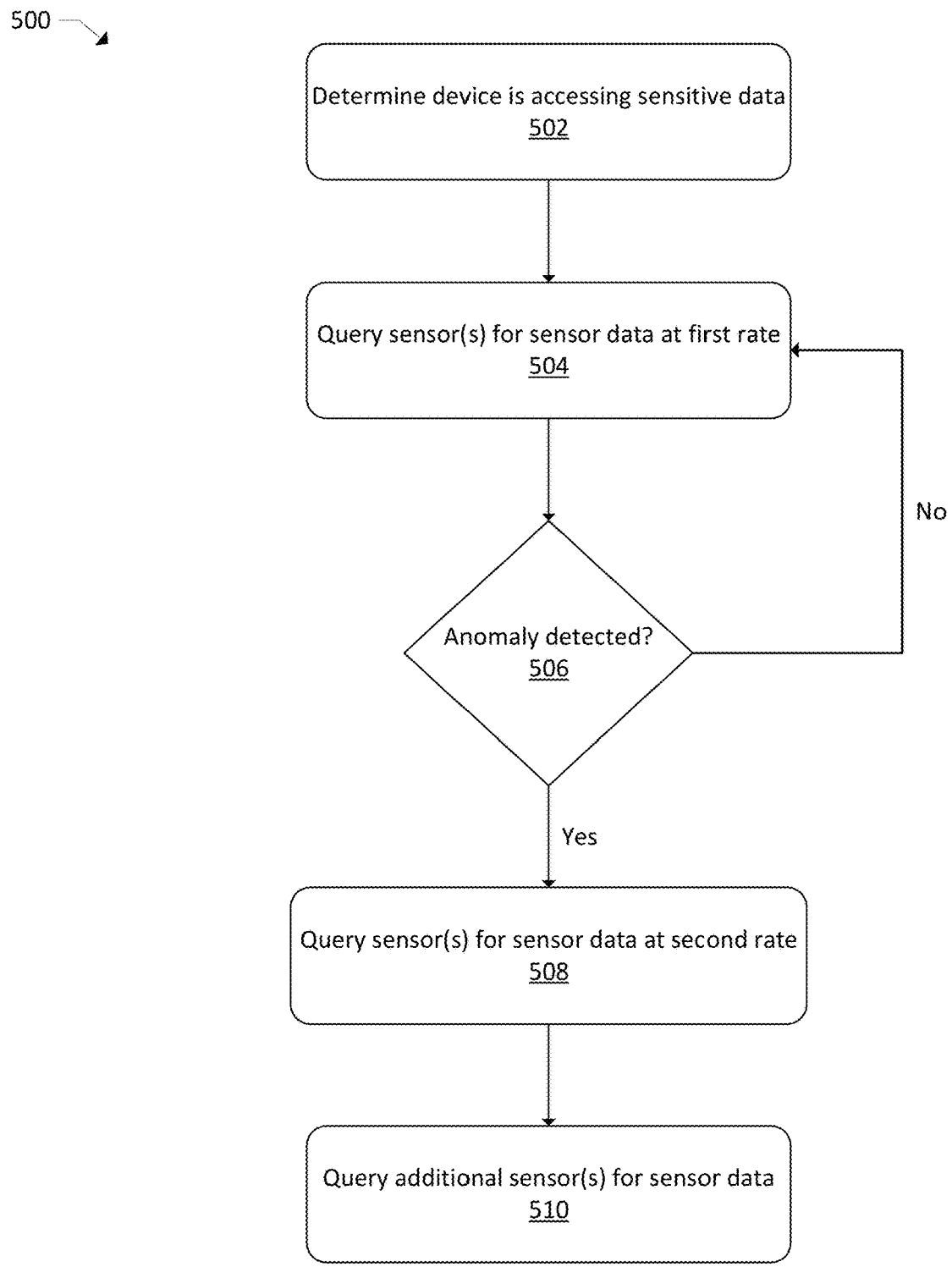
FIG. 5 illustrates a flow diagram of an example process for determining sensor querying rates associated with anomaly detection in workspaces.

FIG. 5 illustrates a flow diagram of an example process 500 for determining sensor querying rates associated with anomaly detection in workspaces. The order in which the operations or steps are described is not intended to be construed as a limitation, and any number of the described operations may be combined in any order and/or in parallel to implement process 500.

At block 502, the process 500 may include determining that a device is accessing sensitive data. For example, a security agent of the device may be configured to determine when to query the one or more sensors associated with the device and/or to determine how to process the sensor data received from the sensors. For example, the security agent may be configured to query the sensors when the security agent receives an indication that a triggering event has occurred. Example triggering events may include when the device is in an "on" state, when the device is connected to a wireless access point, when one or more applications associated with sensitive data access are running on the device, when sensitive data is being displayed on a display of the device, when the device requests sensitive data such as from the remote system, when the user attempts to perform one or more actions associated with the sensitive data, upon the occurrence of a scheduled and/or periodic time and/or event occurring, upon receiving a request to perform anomaly detection such as from another device and/or the remote system, and/or one or more other triggering events associated with the access and/or usage of the sensitive data.

At block 504, the process 500 may include querying one or more sensors for sensor data at a first rate. For example, the security agent and/or a component of the remote system may query the sensors for sensor data at the first rate. The sensors may then generate sensor data and provide the sensor data to the security agent. In some examples, the security agent may be configured to receive the sensor data and send the sensor data to the remote system for further processing and anomaly detection. In these examples, the sensor data may be encrypted and/or otherwise formatted to hinder nefarious actors accessing the sensor data. Additionally, or alternatively, the security agent may be configured to perform some or all of the anomaly detection operations described in more detail herein. The first rate may be predetermined based at least in part on the sensitive data being accessed, historical data associated with anomaly detection, the type of sensor being queried, and/or other information associated with the device and/or the sensitive data.

At block 506, the process 500 may include determining whether an anomaly has been detected. For example, an anomaly detector may be configured to receive input data from a data preprocessor and to utilize the received data to detect one or more anomalies associated with the environment in which the device is situated and/or in the usage of the sensitive data by the user. In examples, the anomaly detector may include a model configured to apply one or more heuristics for detecting anomalies and the anomaly detector may utilize one or more types of the sensor data described herein to detect anomalies. For example, when the sensor data is audio data, the anomaly detector may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector may determine that an anomaly is present, here the possibility of an unauthorized user being in the environment. By way of further example, when the sensor data is image data, the anomaly detector may be configured to determine whether the image data depicts more than one person in the environment. In instances where more than one person is depicted, particularly when the contextual data indicates that only one user is authorized to access sensitive data by the device in question, the anomaly detector may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector may be configured to determine whether the devices connected to the device in question indicates an unsecure environmental condition. For example, a device type of a connected auxiliary device may indicate the capabilities of the device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary device and/or detects a previously-unidentified connected auxiliary device, such an indication may correspond to an anomaly. In general, the anomaly detector may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

In instances where an anomaly has not been detected, the process 500 may proceed back to block 504, where the one or more sensors may be queried for sensor data at the first rate. In these examples, querying for sensor data may be maintained at the first rate.

In instances where an anomaly has been detected, the process 500 may proceed to block 508, where the one or more sensors may be queried for sensor data at a second rate that differs from the first rate. For example, it may be desirable to increase or decrease the rate at which the sensors are queried for sensor data when an anomaly is detected. Determining whether to increase or decrease the rate and by how much may be based at least in part on the anomaly that was detected, a confidence value associated with detection of the anomaly, the sensitive data being accessed, the sensor(s) at issue, etc.

At block 510, the process 500 may include querying one or more additional sensors for sensor data. For example, when a given anomaly is detected, such as the presence of another person in the environment, such as from the analysis of audio data, one or more additional sensors that were not previously being utilized and/or upon which the anomaly detection was not based, may be queried for sensor data. In the example provided herein, a camera may be queried for image data when the audio data indicates the presence of multiple people in the environment.

Figure 6:
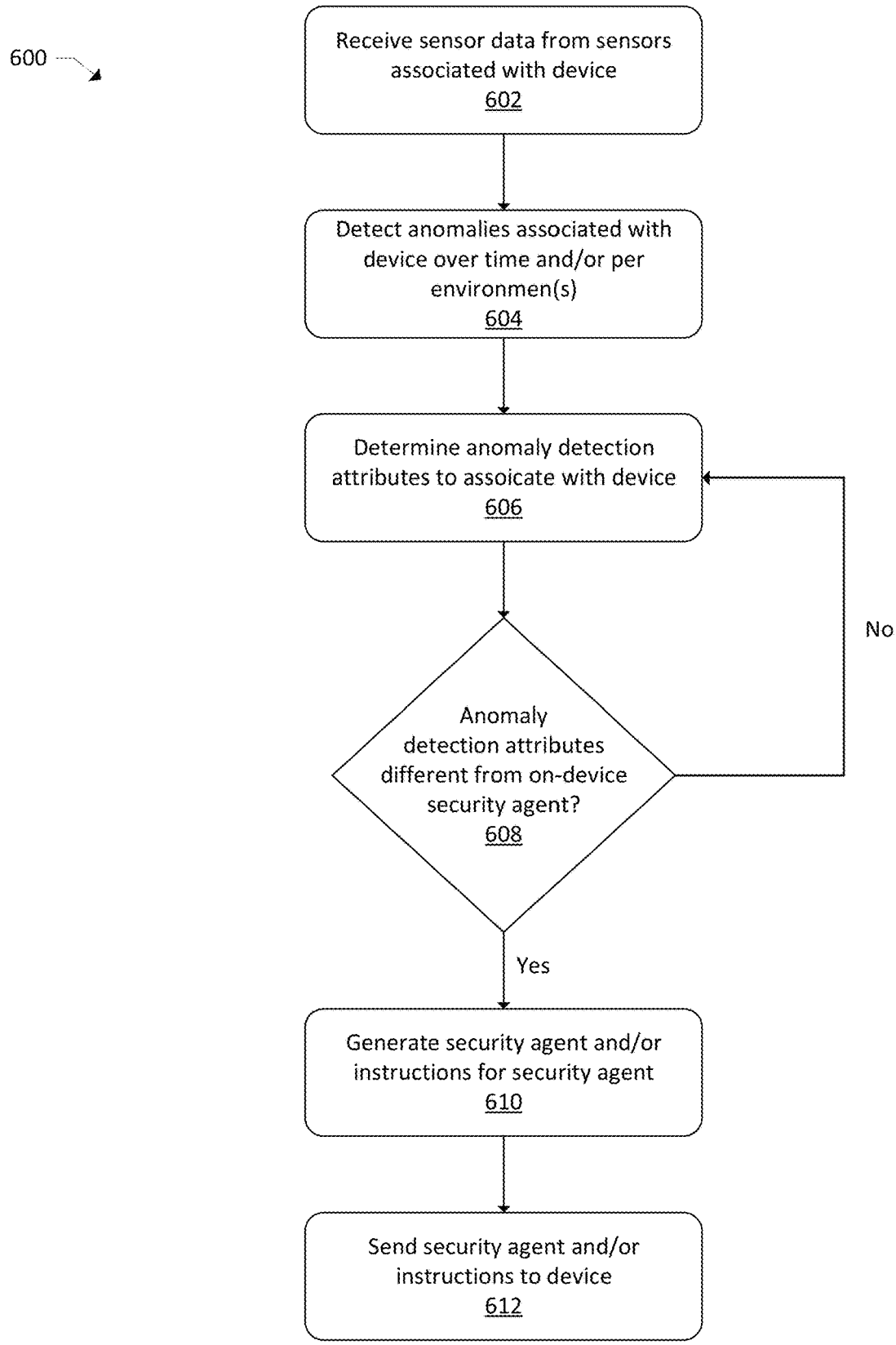
FIG. 6 illustrates a flow diagram of an example process for generating security agents for operation on devices in association with anomaly detection in workspaces.

FIG. 6 illustrates a flow diagram of an example process 600 for generating security agents for operation on devices in association with anomaly detection in workspaces. The order in which the operations or steps are described is not intended to be construed as a limitation, and any number of the described operations may be combined in any order and/or in parallel to implement process 600.

At block 602, the process 600 may include receiving sensor data from one or more sensors associated with a device. For example, a security agent and/or a component of the remote system may query the sensors for sensor data at the first rate. The sensors may then generate sensor data and provide the sensor data to the security agent. In some examples, the security agent may be configured to receive the sensor data and send the sensor data to the remote system for further processing and anomaly detection. In these examples, the sensor data may be encrypted and/or otherwise formatted to hinder nefarious actors accessing the sensor data. Additionally, or alternatively, the security agent may be configured to perform some or all of the anomaly detection operations described in more detail herein.

At block 604, the process 600 may include detecting one or more anomalies associated with the device over time and/or for given environment(s). For example, an anomaly detector may be configured to receive input data from a data preprocessor and to utilize the received data to detect one or more anomalies associated with the environment in which the device is situated and/or in the usage of the sensitive data by the user. In examples, the anomaly detector may include a model configured to apply one or more heuristics for detecting anomalies and the anomaly detector may utilize one or more types of the sensor data described herein to detect anomalies. For example, when the sensor data is audio data, the anomaly detector may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector may determine that an anomaly is present, here the possibility of an unauthorized user being in the environment. By way of further example, when the sensor data is image data, the anomaly detector may be configured to determine whether the image data depicts more than one person in the environment. In instances where more than one person is depicted, particularly when the contextual data indicates that only one user is authorized to access sensitive data by the device in question, the anomaly detector may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector may be configured to determine whether the devices connected to the device in question indicates an unsecure environmental condition. For example, a device type of a connected auxiliary device may indicate the capabilities of the device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary device and/or detects a previously-unidentified connected auxiliary device, such an indication may correspond to an anomaly. In general, the anomaly detector may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

At block 606, the process 600 may include determining one or more anomaly detection attributes to associated with the device. For example, the anomaly detection attributes may include a type of anomaly that is detected, a rate at which anomalies are detected, what sensors are utilized for anomaly detection, sensor querying rates, what anomalies are being searched for, triggering events for sensor usage, etc.

At block 608, the process 600 may include determining whether the anomaly detection attributes are different from the attributes that an on-device security agent is configured to generate sensor data for. For example, a given device may have installed thereon an instance of a security agent configured to operate based at least in part on the anomaly detection attributes. The attributes associated with the currently-installed instance of the security agent may be compared to the determined attributes at block 606 to determine if a difference is present as between the sets of attributes.

In instances where the attributes are not different, then the process 600 may proceed back to block 606. In these examples, the instance of the security agent on the device may be considered up to date and operating in a way that is consistent with anomaly detection as described herein.

In instances where at least one of the attributes differs, then the process 600, at block 610, may include generating a security agent and/or instructions for the security agent. For example, an analytics component may be configured to utilize the data it receives to determine one or more improvements to how the security agent detects anomalies and/or gathers sensor data. For example, the analytics component may indicate the types of sensor data typically involved in detected anomalies, specific anomalies that have been detected, frequency of detected anomalies, etc. This information may be utilized by the analytics component to determine how the security agent should query for sensor data. An agent deployer may receive this information from the analytics component and utilize the information to build the security agents described herein. The security agents, as built by the agent deployer, may be configured to query for sensor data from given sensors, to determine which trigger events to utilize for querying sensor data, what anomaly detection may be performed on the devices and what anomaly detection is to be performed at the remote system, a frequency of sensor data querying and/or anomaly detection, etc.

At block 612, the process 600 may include sending the security agent and/or the instructions to the device. For example, data representing the security agent may be sent to the device for installation on the device.

Figure 7:
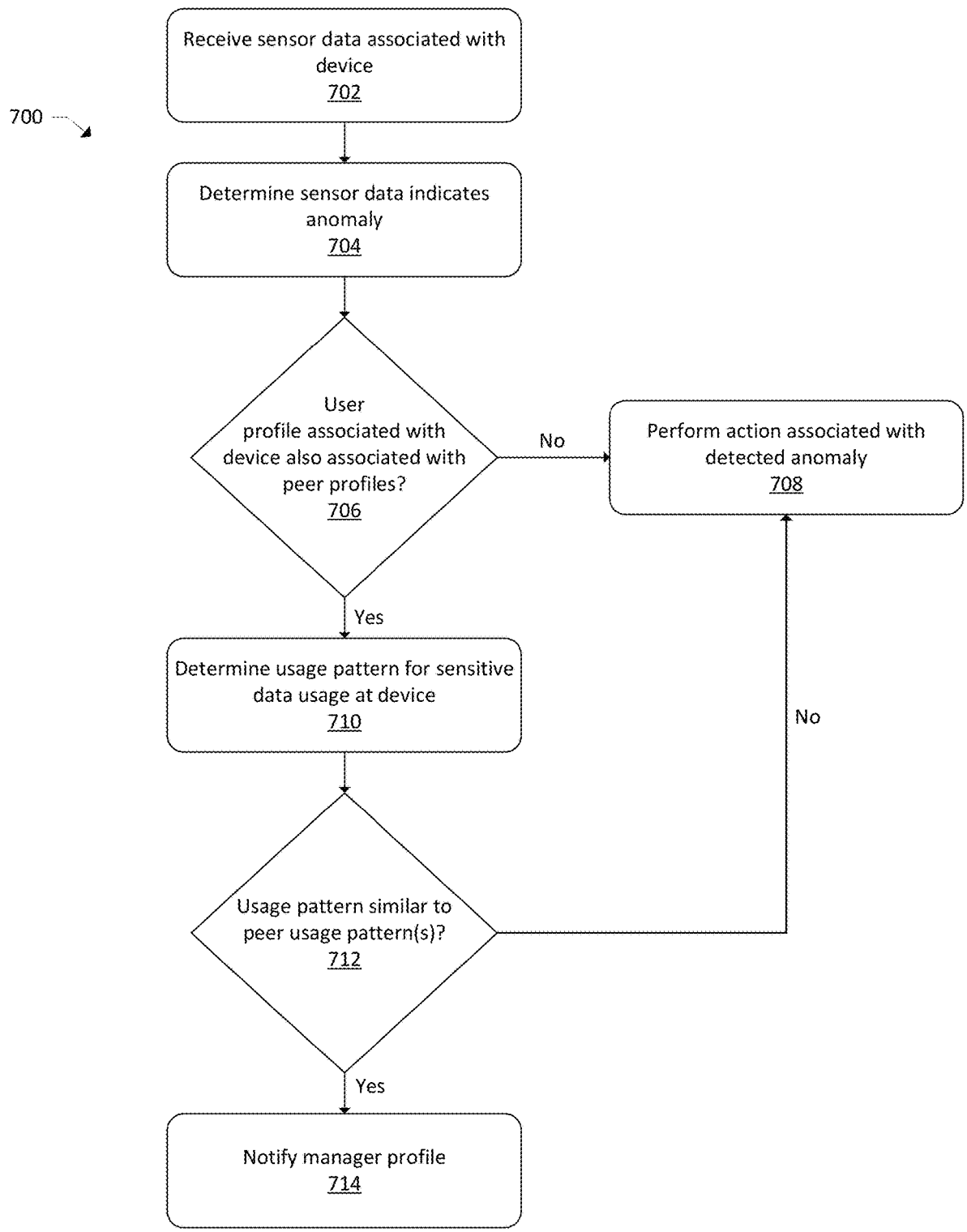
FIG. 7 illustrates a flow diagram of an example process for peer evaluation of sensitive data usage in association with anomaly detection in workspaces.

FIG. 7 illustrates a flow diagram of an example process 700 for peer evaluation of sensitive data usage in association with anomaly detection in workspaces. The order in which the operations or steps are described is not intended to be construed as a limitation, and any number of the described operations may be combined in any order and/or in parallel to implement process 700.

At block 702, the process 700 may include receiving sensor data associated with a device. For example, a security agent and/or a component of the remote system may query the sensors for sensor data at the first rate. The sensors may then generate sensor data and provide the sensor data to the security agent. In some examples, the security agent may be configured to receive the sensor data and send the sensor data to the remote system for further processing and anomaly detection. In these examples, the sensor data may be encrypted and/or otherwise formatted to hinder nefarious actors accessing the sensor data. Additionally, or alternatively, the security agent may be configured to perform some or all of the anomaly detection operations described in more detail herein.

At block 704, the process 700 may include determining that the sensor data indicates detection of an anomaly. For example, an anomaly detector may be configured to receive input data from a data preprocessor and to utilize the received data to detect one or more anomalies associated with the environment in which the device is situated and/or in the usage of the sensitive data by the user. In examples, the anomaly detector may include a model configured to apply one or more heuristics for detecting anomalies and the anomaly detector may utilize one or more types of the sensor data described herein to detect anomalies. For example, when the sensor data is audio data, the anomaly detector may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector may determine that an anomaly is present, here the possibility of an unauthorized user being in the environment. By way of further example, when the sensor data is image data, the anomaly detector may be configured to determine whether the image data depicts more than one person in the environment. In instances where more than one person is depicted, particularly when the contextual data indicates that only one user is authorized to access sensitive data by the device in question, the anomaly detector may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector may be configured to determine whether the devices connected to the device in question indicates an unsecure environmental condition. For example, a device type of a connected auxiliary device may indicate the capabilities of the device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary device and/or detects a previously-unidentified connected auxiliary device, such an indication may correspond to an anomaly. In general, the anomaly detector may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

At block 706, the process 700 may include determining whether user profile data associated with the device is also associated with peer profiles. For example, For example, the user may be associated with a peer group that is authorized to utilize certain sensitive data and/or to utilize the data in certain ways. When an individual user of the peer group is utilizing different data from that used by the group and/or when the data usage differs from usage by the group, such indications may represent an anomaly detected by the anomaly detector.

In instances where the user profile data is not associated with one or more peer profiles, then the process 700, at block 708, may include performing an action associated with the detected anomaly. The action may be determined by an action component as described more fully herein.

In instances where the user profile data is associated with one or more peer profiles, then the process 700, at block 710, may include determining a usage pattern for sensitive data usage at the device. For example, the usage pattern may indicate data types that are accessed and/or how sensitive data is utilized, such as a rate at which the data is accessed, operations performed utilizing the data, databases from which the data is retrieved and stored, etc.

At block 712, the process 700 may include determining whether the usage pattern is similar to peer usage pattern(s). For example, peer user profiles may indicate what data is utilized by the peer group and/or how the data is utilized. A comparison of the sample usage pattern and the peer usage pattern(s) may be performed to determine differences between usage patterns.

In instances where the usage pattern is not similar to the peer usage pattern(s), then the process 700 may proceed back to block 708 where the action may be performed. For example, when a difference between the sample usage pattern satisfies a threshold difference, then the usage pattern may indicate that the anomaly is present or is otherwise not justified by the peer group usage pattern. In these examples, the action may be performed to remedy the unsecure use of the sensitive data.

In instances where the usage pattern is similar to one or more peer usage patterns, then the process 700, at block 714, may include notifying a manager profile of the detected anomaly. In these examples, the peer group usage pattern(s) may indicate a justification for the detected anomaly, at least in part. In other words, otherwise anomalous usage may be determined to be similar to usage by members of the peer group, indicating that while the usage may be an anomaly for other users outside the peer group, for members of the peer group the usage is proper. In these examples, one or more actions may still be performed, such as inclusion of the determinations made herein in a dashboard associated with the manager and/or sending a notification to the manager.

FIG. 8 illustrates a flow diagram of an example process 800 for anomaly detection in workspaces. The order in which the operations or steps are described is not intended to be construed as a limitation, and any number of the described operations may be combined in any order and/or in parallel to implement process 800.

At block 802, the process 800 may include determining that a first device is accessing sensitive data, the first device associated with user profile data indicating authorization for the first device to access the sensitive data, wherein the sensitive data includes data that is associated with one or more access controls to limit access except when authorized. For example, a security agent may be configured to query the sensors when the security agent receives an indication that a triggering event has occurred. Example triggering events may include when the device is in an "on" state, when the device is connected to a wireless access point, when one or more applications associated with sensitive data access are running on the device, when sensitive data is being displayed on a display of the device, when the device requests sensitive data such as from the remote system, when the user attempts to perform one or more actions associated with the sensitive data, upon the occurrence of a scheduled and/or periodic time and/or event occurring, upon receiving a request to perform anomaly detection such as from another device and/or the remote system, and/or one or more other triggering events associated with the access and/or usage of the sensitive data.

At block 804, the process 800 may include, in response to determining that the first device is accessing the sensitive data, analyzing sensor data generated by a sensor of the device configured to detect attributes of an environment associated with the first device. For example, the sensor(s) may be queried for the sensor data. For example, the sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the device, Bluetooth and/or other short-range communication components configured to determine what devices are wirelessly connected to the device, device-connection sensors configured to determine what devices are physically connected to the device, and/or one or more other sensors configured to detect a physical condition of the device and/or the environment in which the device is situated.

At block 806, the process 800 may include querying a contextual data resource for contextual data associated with the sensor data, the contextual data indicating impermissible and permissible attribute contexts. For example, a data preprocessor may also be configured to query and receive contextual data associated with the sensor data for use by the anomaly detector. For example, the data preprocessor may have access to a contextual data component that is configured to store and/or access contextual data that may be utilized for anomaly detection. Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device, device capabilities associated with the auxiliary devices, sensitive data authorization information, peer data usage information, historical sensitive data usage information, and/or any other information associated with the sensor data and/or usage of the sensitive data. The data preprocessor may be configured to determine what contextual information to request from the contextual data component based at least in part on the type of sensor data that is received from the security agent and/or based at least in part on the user profile data associated with access of the sensitive data. For example, when the sensor data is audio data, the data preprocessor may be configured to query the contextual data component for reference audio data and/or audio signatures associated with the user profile data. In this way, sample audio data from the environment may be compared to the reference audio data to determine if the sample audio data indicates an anomaly. By way of further example, sample image data may be compared to reference image data to determine if the sample image data indicates an anomaly. Additional examples of contextual data usage for anomaly detection purposes are described below with respect to the anomaly detector.

At block 808, the process 800 may include determining, from the sensor data and the contextual data, that an unsecure condition is associated with the environment, the unsecure condition predetermined to indicate that the environment is unsecure for accessing the sensitive data. For example, an anomaly detector may be configured to receive input data from the data preprocessor and to utilize the received data to detect one or more anomalies associated with the environment in which the device is situated and/or in the usage of the sensitive data by the user. In examples, the anomaly detector may include a model configured to apply one or more heuristics for detecting anomalies and the anomaly detector may utilize one or more types of the sensor data described herein to detect anomalies. For example, when the sensor data is audio data, the anomaly detector may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector may determine that an anomaly is present, here the possibility of an unauthorized user being in the environment. By way of further example, when the sensor data is image data, the anomaly detector may be configured to determine whether the image data depicts more than one person in the environment. In instances where more than one person is depicted, particularly when the contextual data indicates that only one user is authorized to access sensitive data by the device in question, the anomaly detector may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector 130 may be configured to determine whether the currently-used network is permitted. Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector may be configured to determine whether the devices connected to the device in question indicates an unsecure environmental condition. For example, a device type of a connected auxiliary device may indicate the capabilities of the auxiliary device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary devices and/or indicates a previously-unidentified connected auxiliary device, such an indication may correspond to an anomaly. In general, the anomaly detector may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

At block 810, the process 800 may include determining an action to take in response to the unsecure condition. For example, an action component may be configured to determine an action to be performed based at least in part on the anomaly. The actions may include, for example, sending a notification of the anomaly to the device, sending a notification to another device such as a device associated with a manager, restricting access to the sensitive data, ceasing authorization to the sensitive data by the user, causing the sensitive data to be prevented from being displayed, locking the device, causing the device to shut down, and/or one or more other actions.

At block 812, the process 800 may include causing the action to be performed, the action restricting unsecure use of the sensitive data. For example, particularly when the action includes the device performing one or more operations, a command to perform the action may be sent to the security agent of the device and the security agent may cause the device to perform the action.

Additionally, or alternatively, the process 800 may include storing first data indicating a first number of times per period of time that the sensor data is analyzed. The process 800 may also include storing second data indicating past detection of unsecure conditions associated with the user profile data. The process 800 may also include determining, from the second data, that a number of detections of the unsecure conditions satisfies a threshold number. The process 800 may also include, in response to the number of detections of the unsecure conditions satisfying the threshold number, storing, instead of the first data, third data indicating a second number of times per the period of time that the first device is to be queried for the sensor data, the second number of times being more than the first number of times.

Additionally, or alternatively, the process 800 may include determining a data type associated with the sensitive data. The process 800 may also include determining that the data type is a predetermined type indicated as being more sensitive than other data types available to a user associated with the user profile data. The process 800 may also include selecting, in response to the data type being the predetermined type, the sensor from multiple sensors associated with the first device for receiving the sensor data.

Additionally, or alternatively, the process 800 may include determining the unsecure condition is associated with a notification action. The process 800 may also include sending, to a second device associated with manager profile data, notification data indicating the unsecure condition in association with the user profile data. The process 800 may also include receiving response data from the second device, the response data confirming that the action should be taken. In these examples, causing the action to be performed may be in response to the response data.

FIG. 9 illustrates a flow diagram of another example process 900 for anomaly detection in workspaces. The order in which the operations or steps are described is not intended to be construed as a limitation, and any number of the described operations may be combined in any order and/or in parallel to implement process 900.

At block 902, the process 900 may include receiving sensor data generated by a sensor associated with a first device, the sensor configured to detect an attribute of an environment associated with the first device while the first device accesses first data associated with one or more access controls to limit access except when authorized. For example, the sensor(s) may be queried for the sensor data. For example, the sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the device, Bluetooth and/or other short-range communication components configured to determine what devices are wirelessly connected to the device, device-connection sensors configured to determine what devices are physically connected to the device, and/or one or more other sensors configured to detect a physical condition of the device and/or the environment in which the device is situated. In examples where the sensor is not specifically associated with the first device, the sensor may be configured to generate data indicating events associated with the environment. For example, the sensor may include any component that receives information about the city, state, or otherwise area associated with the environment, such as events occurring in the area that may render the environment unsecure for accessing sensitive information.

At block 904, the process 900 may include receiving, from a contextual data resource, contextual data associated with the sensor data. For example, a data preprocessor may also be configured to query and receive contextual data associated with the sensor data for use by the anomaly detector. For example, the data preprocessor may have access to a contextual data component that is configured to store and/or access contextual data that may be utilized for anomaly detection. Example contextual data may include geographic location indicators associated with network access point identifiers, reference audio data and/or audio signatures associated with the user profile data, reference image data and/or image signatures associated with the user profile data, data indicating reference objects associated with user environments, reference network access point identifiers, reference device identifiers for auxiliary devices associated with the device, device capabilities associated with the auxiliary devices, sensitive data authorization information, peer data usage information, historical sensitive data usage information, and/or any other information associated with the sensor data and/or usage of the sensitive data. The data preprocessor may be configured to determine what contextual information to request from the contextual data component based at least in part on the type of sensor data that is received from the security agent and/or based at least in part on the user profile data associated with access of the sensitive data. For example, when the sensor data is audio data, the data preprocessor may be configured to query the contextual data component for reference audio data and/or audio signatures associated with the user profile data. In this way, sample audio data from the environment may be compared to the reference audio data to determine if the sample audio data indicates an anomaly. By way of further example, sample image data may be compared to reference image data to determine if the sample image data indicates an anomaly. Additional examples of contextual data usage for anomaly detection purposes are described below with respect to the anomaly detector.

At block 906, the process 900 may include determining, based at least in part on the sensor data and the contextual data, that a condition is associated with the environment, the condition indicating the environment is unsecure for accessing the first data. For example, an anomaly detector may be configured to receive input data from the data preprocessor and to utilize the received data to detect one or more anomalies associated with the environment in which the device is situated and/or in the usage of the sensitive data by the user. In examples, the anomaly detector may include a model configured to apply one or more heuristics for detecting anomalies and the anomaly detector may utilize one or more types of the sensor data described herein to detect anomalies. For example, when the sensor data is audio data, the anomaly detector may be configured to determine whether the audio data includes user speech and to analyze the audio data to determine how many voices make up the user speech. In instances where more than one voice is detected, particularly when the contextual data indicates that only one user is authorized to access sensitive data by the device in question, the anomaly detector may determine that an anomaly is present, here the possibility of an unauthorized user being in the environment. By way of further example, when the sensor data is image data, the anomaly detector may be configured to determine whether the image data depicts more than one person in the environment. In instances where more than one person is depicted, particularly when the contextual data indicates that only one user is authorized to access sensitive data by the device in question, the anomaly detector may determine that an anomaly is present, here the possibility of an unauthorized user being in the environment. The audio data and/or image data may also be compared to the reference audio data and/or reference image data described herein to determine if the user speech and/or user images indicate that the user is the authorized user.

In still other examples, when the sensor data is network associated data, the anomaly detector may be configured to determine whether the network being utilized to access the sensitive data is a permitted network and/or whether the network indicates that the environment is a permitted environment for accessing the sensitive data. For example, the contextual data may indicate a network identifier of a home network associated with the user profile data. In instances where the network associated data indicates that the device is accessing the sensitive data utilizing the home network identifier, such a signal may indicate permissible use of the sensitive data. However, in instances where the network associated data indicates that the device is utilizing a network other than a previously permitted network, the anomaly detector 130 may be configured to determine whether the currently-used network is permitted.

Information about the network, such as whether the network is public or private, whether the network requires a password to access or is otherwise associated with access controls, whether the network changes, such as while the sensitive data is being accessed, whether the network is associated with a known public place, etc. may be utilized by the anomaly detector to determine whether an anomaly is present. These network-based anomalies may include, for example, an indication that the device is connected to a publicly-accessible network, that the device is located in a public place where other individuals may view the display of the device, that the device is located in a geographic location that is not affiliated with the user, that the device is in motion such as on a bus or other unsecure environment, etc.

In still other examples, when the sensor data is device connectivity data, the anomaly detector may be configured to determine whether the devices connected to the device in question indicates an unsecure environmental condition. For example, a device type of a connected auxiliary device may indicate the capabilities of the auxiliary device and whether those capabilities indicate an anomaly. By way of example, if a connected auxiliary device is a speaker, such information may indicate that audio representing the sensitive data is being output to the environment in question, which may violate security policies and thus indicate an anomaly. In other examples, when the connected device indicates that the device has recording functionality, connection of such a device may violate security policies and thus indicate an anomaly. Additionally, the number of connected devices may also indicate an anomaly. For example, a given device may typically have a certain number of connected auxiliary devices associated with it and/or the identifiers of the typical connected auxiliary devices may be known. When the sensor data indicates an increase in the number of connected auxiliary devices and/or indicates a previously-unidentified connected auxiliary device, such an indication may correspond to an anomaly. In general, the anomaly detector may be configured to receive, as input, sensor data indicating one or more attributes of an environment in which the device is situated and/or one or more conditions of the device and to utilize heuristics, rules, and/or modeling such as machine learning to determine whether the sensor data indicates that the environment is unsecure for accessing and utilizing the sensitive data. Some additional anomalies that may be detected include the number of people in a room, the identities of people in a room, presence of certain devices in a room and/or in communication with the device in question, whether the environment itself is predetermined as a secure environment, and the use of an auxiliary device to record the sensitive data such as the taking of a picture of the device display, recording of audio, copying of data, etc.

At block 908, the process 900 may include determining an action to take based at least in part on the condition. For example, an action component may be configured to determine an action to be performed based at least in part on the anomaly. The actions may include, for example, sending a notification of the anomaly to the device, sending a notification to another device such as a device associated with a manager, restricting access to the sensitive data, ceasing authorization to the sensitive data by the user, causing the sensitive data to be prevented from being displayed, locking the device, causing the device to shut down, and/or one or more other actions.

At block 910, the process 900 may include causing the action to be performed to mitigate unsecure access of the first data. For example, particularly when the action includes the device performing one or more operations, a command to perform the action may be sent to the security agent of the device and the security agent may cause the device to perform the action.

Additionally, or alternatively, the process 900 may include storing first data indicating a first number of times per period the sensor data is analyzed. The process 900 may also include storing second data indicating past detection of unsecure conditions associated with the first device. The process 900 may also include determining, based at least in part on the second data, that a number of detections of the unsecure conditions satisfies a threshold number. The process 900 may also include storing, based at least in part on the number of detections of the unsecure conditions satisfying the threshold number, third data indicating a second number of times per the period of time to query for the sensor data.

Additionally, or alternatively, the process 900 may include determining a data type associated with the first data. The process 900 may also include determining that the data type is a predetermined type indicated as being more sensitive than other data types. The process 900 may also include selecting, based at least in part on the data type being the predetermined data type, the sensor from multiple sensors associated with the first device for receiving the sensor data.

Additionally, or alternatively, the process 900 may include determining the condition is associated with a notification action. The process 900 may also include sending, to a second device associated with manager profile data, notification data indicating the condition has been detected. The process 900 may also include receiving response data from the second device, the response data confirming that the action should be taken. In these examples, causing the action to be performed may be based at least in part on the response data.

Additionally, or alternatively, the process 900 may include determining conditions detected in association with the first device over a period of time. The process 900 may also include generating, based at least in part on one or more of the conditions, second data representing instructions for causing the first device to generate the sensor data associated with the one or more of the conditions. The process 900 may also include sending the second data to the first device, the second data stored on the first device and utilized by the first device for generating the sensor data.

Additionally, or alternatively, the process 900 may include determining that the usage of the first data in association with the first device differs from the usage of the first data in association with the peer user profile data by at least a threshold amount. In these examples, determining that the condition is associated with the environment may be based at least in part on the usage of the first data in association with the first device differing from the usage of the first data in association with the peer user profile data by the at least the threshold amount.

Additionally, or alternatively, the process 900 may include an embodiment where the sensor data indicates an identifier of a wireless network that the first device is utilizing to access the first data. Also, the contextual data may indicate a geographic location associated with the wireless network, the geographic location indicated as being unsecure. In these examples, determining that the condition is associated with the environment may be based at least in part on the geographic location being unsecure.

Additionally, or alternatively, the process 900 may include an embodiment where the sensor data indicates a device type of a second device that is in communication with the first device. Also, the contextual data may indicate that the device type has been determined to cause the environment to be unsecure. In these examples, determining that the condition is associated with the environment may be based at least in part on the second device being in communication with the first device.

Figure 10:
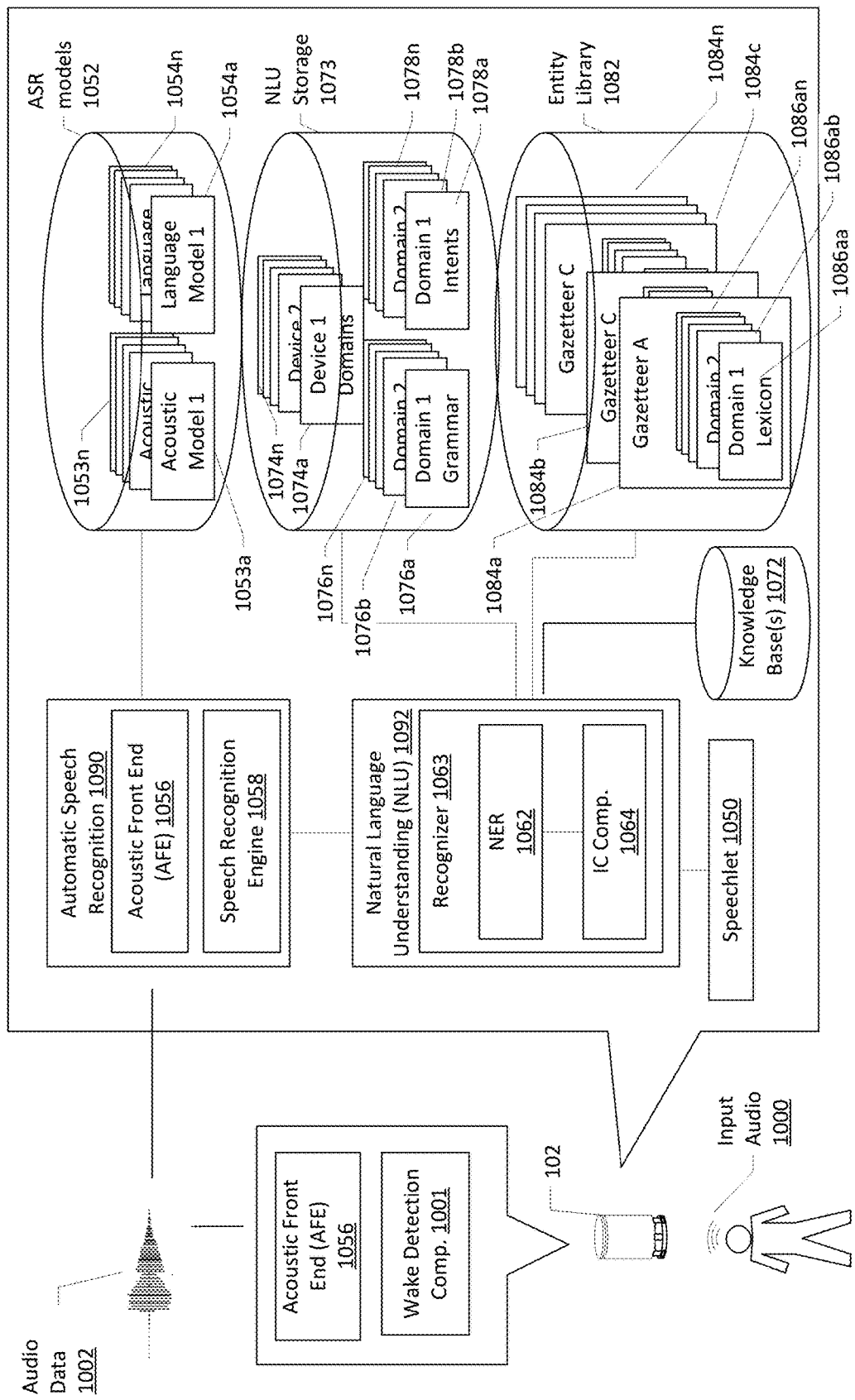
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 114 of the device 102, or another device, captures audio 1000 corresponding to a spoken utterance. The device 102, using a wake word engine 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 1090. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 1090.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1002 may include data corresponding to the wakeword. Further, a local device may "wake" upon detection of speech/spoken audio above a threshold, as described herein. An ASR component 1090 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1090 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, start virtual working session?" The wake detection component may identify the wake word, otherwise described as a trigger expression, "Alexa," in the user utterance and may "wake" based on identifying the wake word. The speech recognition engine 1058 may identify, determine, and/or generate text data corresponding to the user utterance, here "start a virtual working session."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 1092 may include various components, including potentially dedicated processor(s), memory, storage, etc. As shown in FIG. 10, an NLU component 1092 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 1090 based on the utterance input audio 1000) and attempts to make a semantic interpretation of the text. That is, the NLU process determines the meaning behind the text based on the individual words and then implements that meaning. NLU processing 1092 interprets a text string to derive an intent or a desired action from the user as well as the pertinent pieces of information in the text that allow a device (e.g., device 102) to complete that action. For example, if a spoken utterance is processed using ASR 1090 and outputs the text "start virtual work session" the NLU process may determine that the user intended to initiate a virtual working session.

The NLU 1092 may process several textual inputs related to the same utterance. For example, if the ASR 1090 outputs N text segments (as part of an N-best list), the NLU may process all N outputs to obtain NLU results.

As will be discussed further below, the NLU process may be configured to parse and tag to annotate text as part of NLU processing. For example, for the text "start virtual work session," "start work session" may be tagged as a command (to initiate a work session) and "virtual" may be tagged as the naming identifier of the work session.

To correctly perform NLU processing of speech input, an NLU process 1092 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 1092 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1050. The destination speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1050 may provide some or all of this information to a text-to-speech (TTS) engine. The TTS engine may then generate an actual audio file for outputting the audio data determined by the application (e.g., "okay," or "work session started").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 1090). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 104, as illustrated herein are exemplary, and may be located in a stand-alone device or may be included, in whole or in part, as a component of a larger device or system, may be distributed across a network or multiple devices connected by a network, etc.

Figure 11:
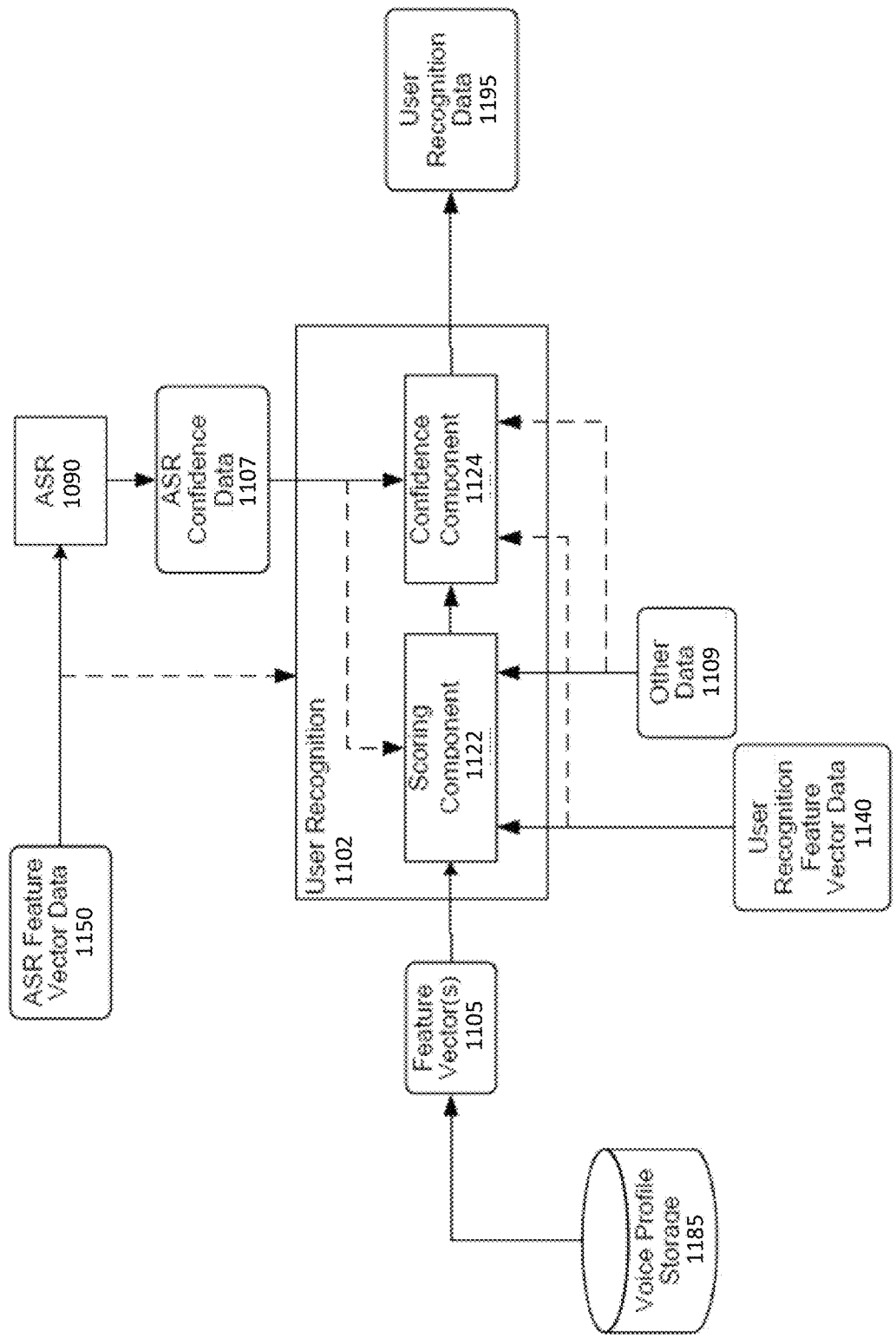
FIG. 11 is a system flow diagram illustrating user recognition according to embodiments of the present disclosure.

FIG. 11 illustrates user recognition processing as may be performed by a user recognition engine 1102. The ASR component 1090 performs ASR processing on the ASR feature vector data 1150. ASR confidence data 1107 may be passed to the user recognition engine 1102.

The user recognition engine 1102 performs user recognition using various data including the user recognition feature vector data 1150, feature vectors 1105 representing explicit and/or anonymous voice profiles, the ASR confidence data 1107, and other data 1109. The user recognition engine 1102 may output the user recognition data 1195, which reflects a certain confidence that the user input was spoken by one or more particular users. The user recognition data 1195 may include one or more user identifiers (e.g., corresponding to one or more explicit voice profiles and/or one or more anonymous voice profiles). Each user identifier in the user recognition data 1195 may be associated with a respective confidence value, representing a likelihood that the user input corresponds to the user identifier. A confidence value may be a numeric or binned value.

The feature vector(s) 1105 input to the user recognition engine 1102 may correspond to one or more anonymous voice profiles and/or one or more explicit voice profiles. The user recognition engine 1102 may use the feature vector(s) 1105 to compare against the user recognition feature vector 1150, representing the present user input, to determine whether the user recognition feature vector 1150 corresponds to one or more of the feature vectors 905 of the anonymous and/or explicit voice profiles.

Each feature vector 1105 may be the same size as the user recognition feature vector 1040. For example, if the user recognition feature vector 1105 is of size F (for example encoded by the encoder 1150), a feature vector 1105 may also be of size F.

To perform user recognition, the user recognition engine 1102 may determine the device 102 from which the audio data 1011 originated. For example, the audio data 102 may be associated with metadata including a device identifier representing the device 102. Either the device 102 or the system(s) may generate the metadata. The system(s) may determine a group profile identifier associated with the device identifier, may determine user identifiers associated with the group profile identifier, and may include the group profile identifier and/or the user identifiers in the metadata. The system(s) may associate the metadata with the user recognition feature vector 1150 produced from the audio data 1002. The user recognition engine 1102 may send a signal to the voice profile storage 1185, with the signal requesting only audio data and/or feature vectors 1105 (depending on whether audio data and/or corresponding feature vectors are stored) associated with the device identifier, the group profile identifier, and/or the user identifiers represented in the metadata. This limits the universe of possible feature vectors 1105 the user recognition engine 1102 considers at runtime and thus decreases the amount of time to perform user recognition processing by decreasing the amount of feature vectors 1105 needed to be processed. Alternatively, the user recognition engine 1102 may access all (or some other subset of) the audio data and/or feature vectors 1105 available to the user recognition engine 1102. However, accessing all audio data and/or feature vectors 1105 will likely increase the amount of time needed to perform user recognition processing based on the magnitude of audio data and/or feature vectors 1105 to be processed.

If the user recognition engine 1102 receives audio data from the voice profile storage 1185, the user recognition engine 1102 may generate one or more feature vectors 1105 corresponding to the received audio data.

The user recognition engine 1102 may attempt to identify the user that spoke the speech represented in the audio data 1002 by comparing the user recognition feature vector 1150 to the feature vector(s) 1105. The user recognition engine 1102 may include a scoring component 1122 that determines respective scores indicating whether the user input (represented by the user recognition feature vector 1150) was spoken by one or more particular users (represented by the feature vector(s) 1105). The user recognition engine 1102 may also include a confidence component 1124 that determines an overall accuracy of user recognition processing (such as those of the scoring component 1122) and/or an individual confidence value with respect to each user potentially identified by the scoring component 1122. The output from the scoring component 1122 may include a different confidence value for each received feature vector 1105. For example, the output may include a first confidence value for a first feature vector 1105a (representing a first anonymous or explicit voice profile), a second confidence value for a second feature vector 1105b (representing a second anonymous or explicit voice profile), etc. Although illustrated as two separate components, the scoring component 1122 and the confidence component 1124 may be combined into a single component or may be separated into more than two components.

The scoring component 1122 and the confidence component 1124 may implement one or more trained machine learning models (such neural networks, classifiers, etc.) as known in the art. For example, the scoring component 1122 may use probabilistic linear discriminant analysis (PLDA) techniques. PLDA scoring determines how likely it is that the user recognition feature vector 740 corresponds to a particular feature vector 1105. The PLDA scoring may generate a confidence value for each feature vector 1105 considered and may output a list of confidence values associated with respective user identifiers, anonymous voice profile identifiers, and/or explicit voice profile identifiers.

The scoring component 1122 may also use other techniques, such as GMMs, generative Bayesian models, or the like, to determine confidence values.

The confidence component 1124 may input various data including information about the ASR confidence 1107, speech length (e.g., number of frames or other measured length of the user input), audio condition/quality data (such as signal-to-interference data or other metric data), fingerprint data, image data, or other factors to consider how confident the user recognition engine 1102 is with regard to the confidence values linking users to the user input. The confidence component 1124 may also consider the confidence values and associated identifiers output by the scoring component 1122. For example, the confidence component 1124 may determine that a lower ASR confidence 1107, or poor audio quality, or other factors, may result in a lower confidence of the user recognition engine 1102. Whereas a higher ASR confidence 1107, or better audio quality, or other factors, may result in a higher confidence of the user recognition engine 1102. Precise determination of the confidence may depend on configuration and training of the confidence component 1124 and the model(s) implemented thereby. The confidence component 1124 may operate using a number of different machine learning models/techniques such as GMM, neural networks, etc. For example, the confidence component 1124 may be a classifier configured to map a score output by the scoring component 1122 to a confidence value.

The user recognition engine 1102 may output user recognition data 1195 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition engine 1102 may output user recognition data 1195 with respect to each received feature vector 1105. The user recognition data 1195 may include numeric confidence values (e.g., 0.0-1.0, 0-1000, or whatever scale the system is configured to operate). Thus the user recognition data 1195 may output an N-best list of potential users with numeric confidence values (e.g., user identifier 123-0.2, anonymous voice profile identifier 234-0.8). Alternatively or in addition, the user recognition data 1195 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition engine 1102 may output an N-best list of potential users with binned confidence value (e.g., user identifier 123—low, anonymous voice profile identifier 234—high). Combined binned and numeric confidence value outputs are also possible. Rather than a list of identifiers and their respective confidence values, the user recognition data 1195 may only include information related to the top scoring identifier as determined by the user recognition engine 1102. The user recognition engine 1102 may also output an overall confidence value that the individual confidence values are correct, where the overall confidence value indicates how confident the user recognition engine 1102 is in the output results. The overall confidence value may be determined by the confidence component 1124.

The confidence component 1124 may determine differences between individual confidence values when determining the user recognition data 1195. For example, if a difference between a first confidence value and a second confidence value is large, and the first confidence value is above a threshold confidence value, then the user recognition engine 1102 395 is able to recognize a first user (associated with the feature vector 1105 associated with the first confidence value) as the user that spoke the user input with a much higher confidence than if the difference between the confidence values were smaller.

The user recognition engine 1102 may perform thresholding to avoid incorrect user recognition data 1195 being output. For example, the user recognition engine 1102 may compare a confidence value output by the confidence component 1124 to a threshold confidence value. If the confidence value does not satisfy (e.g., does not meet or exceed) the threshold confidence value, the user recognition engine 1102 may not output user recognition data 1195, or may only include in that data 1195 an indicator that a user speaking the user input could not be recognized. Further, the user recognition engine 1102 may not output user recognition data 1195 until enough user recognition feature vector data 1150 is accumulated and processed to verify a user above a threshold confidence value. Thus the user recognition engine 1102 may wait until a sufficient threshold quantity of audio data of the user input has been processed before outputting user recognition data 1195. The quantity of received audio data may also be considered by the confidence component 1124.

The user recognition engine 1102 may be defaulted to output binned (e.g., low, medium, high) user recognition confidence values. However, such may be problematic in certain situations. For example, if the user recognition engine 1102 computes a single binned confidence value for multiple feature vectors 1105, the system may not be able to effectively determine which user originated the user input. In this situation, the user recognition engine 1102 may be configured to override its default setting and output numeric confidence values. This enables the system to determine a user, associated with the highest numeric confidence value, originated the user input.

The user recognition engine 1102 may use other data 1109 to inform user recognition processing. A trained model(s) or other component of the user recognition engine 1102 may be trained to take other data 1109 as an input feature when performing user recognition processing. Other data 1109 may include a variety of data types depending on system configuration and may be made available from other sensors, devices, or storage. The other data 1109 may include a time of day at which the audio data 1011 was generated by the device 102 or received from the device 102, a day of a week in which the audio data audio data 1011 was generated by the device 102 or received from the device 102, etc.

The other data 1109 may include image data or video data. For example, facial recognition may be performed on image data or video data received from the device 102 from which the audio data 1011 was received (or another device). Facial recognition may be performed by the user recognition engine 1102, or another component of the system(s). The output of facial recognition processing may be used by the user recognition engine 1102. That is, facial recognition output data may be used in conjunction with the comparison of the user recognition feature vector 1150 and one or more feature vectors 1105 to perform more accurate user recognition processing.

The other data 1109 may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data 1109 may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data 1011 was received is a smart watch or vehicle belonging to a user A, the fact that the device 102 belongs to user A may increase a user recognition confidence value associated with user A and/or decrease a user recognition confidence value associated with user B.

The other data 1109 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 1011 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data 1109 may include data representing activity of a particular user that may be useful in performing user recognition processing. For example, if a user has recently entered a code to disable a home security alarm, and the audio data 1002 was received from a device 102 represented in a group profile associated with the home, signals from the home security alarm about the disabling user, time of disabling, etc. may be reflected in the other data 1109 and considered by the user recognition engine 1102. If a mobile device (such as a smart phone, Tile, dongle, or other device) known to be associated with a particular user is detected proximate to (for example physically close to, connected to the same WiFi network as, or otherwise nearby) the device 102, this may be reflected in the other data 1109 and considered by the user recognition engine 1102.

Depending on system configuration, the other data 1109 may be configured to be included in the user recognition feature vector data 1040 (for example using the encoder) so that all the data relating to the user input to be processed by the scoring component 1122 may be included in a single feature vector. Alternatively, the other data 1109 may be reflected in one or more different data structures to be processed by the scoring component 1122.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

FIG. 12 illustrates a table 1200 showing contextual information associated with network identifiers utilized for anomaly detection in workspaces. The table 1200 may represent data acquired and/or stored in association with the systems described herein. The data types associated with the table 1200 may include a network identifier 1202, a known network identifier 1204, a public/private network indicator 1206, and/or a location identifier 1208 associated with a given network. It should be understood that while the data structure described with respect to FIG. 12 is illustrated in the form of a table, the data structure may be any structure that includes some or all of the data described with respect to FIG. 12.

The network identifier 1202 may include information that identifies the network that a device is utilizing to access sensitive data. For example, the network identifier 1202 may be a naming indicator associated with a network, such as Network A, Network B, and/or Network C. The network identifier 1202 may additionally, or alternatively, be a SSID of a given network, such as "1593BCH76JD1" and "2KLKDFO4068FFF5" as illustrated in FIG. 12. The known network identifier 1204 may include an indication of whether the network is "known" to the system. The network may be known, for example, when the device has previously accessed sensitive data utilizing the network and/or one or more other users have accessed the network in the past, and/or whether the contextual data known to the system includes information associated with the network in question. The public/private network indicator 1206 may indicate whether the network is a public network or a private network. Public networks may be those that are openly available for connection to the public, such as without access controls and/or without restrictions on the devices that may access the network. Private networks may be those that are associated with at least some form of access control and/or that have authorized only certain devices and/or device types to access the network. The location identifier 1208 may provide location-related information known about the network in question. For example, the location-related information may be contextual data indicating an address, city, and/or state associated with the network. The location-related information may additionally, or alternatively, include an identifier of a company or otherwise an entity associated with the network, and/or a geographic location associated with the network, and/or a naming identifier given for the location of the network such as "home." In some examples, when no contextual data is known about the location of the network, the location identifier 1208 may be "unknown." Some or all of this data may be utilized by the anomaly detector, as described more fully above, to determine if an anomaly associated with the network is present and what action to take in response to detecting the anomaly.

FIG. 13 illustrates a table 1300 showing contextual information associated with connected devices utilized for anomaly detection in workspaces. The table 1300 may represent data acquired and/or stored in association with the systems described herein. The data types associated with the table 1300 may include a device identifier 1302, a known device identifier 1304, a device type indicator 1306, and/or an anomaly indicator 1308 associated with a given device. It should be understood that while the data structure described with respect to FIG. 13 is illustrated in the form of a table, the data structure may be any structure that includes some or all of the data described with respect to FIG. 13.

The device identifier 1302 may include information that identifies the device that is connected to or otherwise in communication with a primary device being utilized to access sensitive data. For example, the device identifier 1302 may be a naming indicator associated with a device, such as Device A, Device B, and/or Device C. The device identifier 1302 may additionally, or alternatively, be a numerical and/or alphabetic identifier of a given device, such as "DLJ3248DDR2" and "FL69VGK29FK" as illustrated in FIG. 13. The known device identifier 1304 may include an indication of whether the device is "known" to the system. The device may be known, for example, when the device has previously been connected to the primary device and/or when one or more other users have utilized the device, and/or when the contextual data known to the system includes information associated with the device in question. The device type indicator 1306 may include information on the device type associated with the device in question. Example device types include "loud speaker," "removable storage," "headphones," "keyboard," "mobile phone," etc. These indicators may describe, at least in part, functionality associated with the devices. The anomaly identifier 1308 may provide information associated with what anomaly may be associated with the device. Example anomaly identifiers may include "audio," "data copying," "cadence," "access," etc. For example, a loudspeaker device may output audio representing sensitive data into an environment as opposed to just a worker, which increases risk that an unauthorized person would hear the audio. By way of additional example, connection of a removable storage device indicates a risk that sensitive data may be copied to the device. In some examples, when no contextual data is known about the device and/or when the contextual data indicates no anomaly is present, the anomaly identifier 1308 may be "unknown."

Some or all of this data may be utilized by the anomaly detector, as described more fully above, to determine if an anomaly associated with the device is present and what action to take in response to detecting the anomaly.

Figure 14:
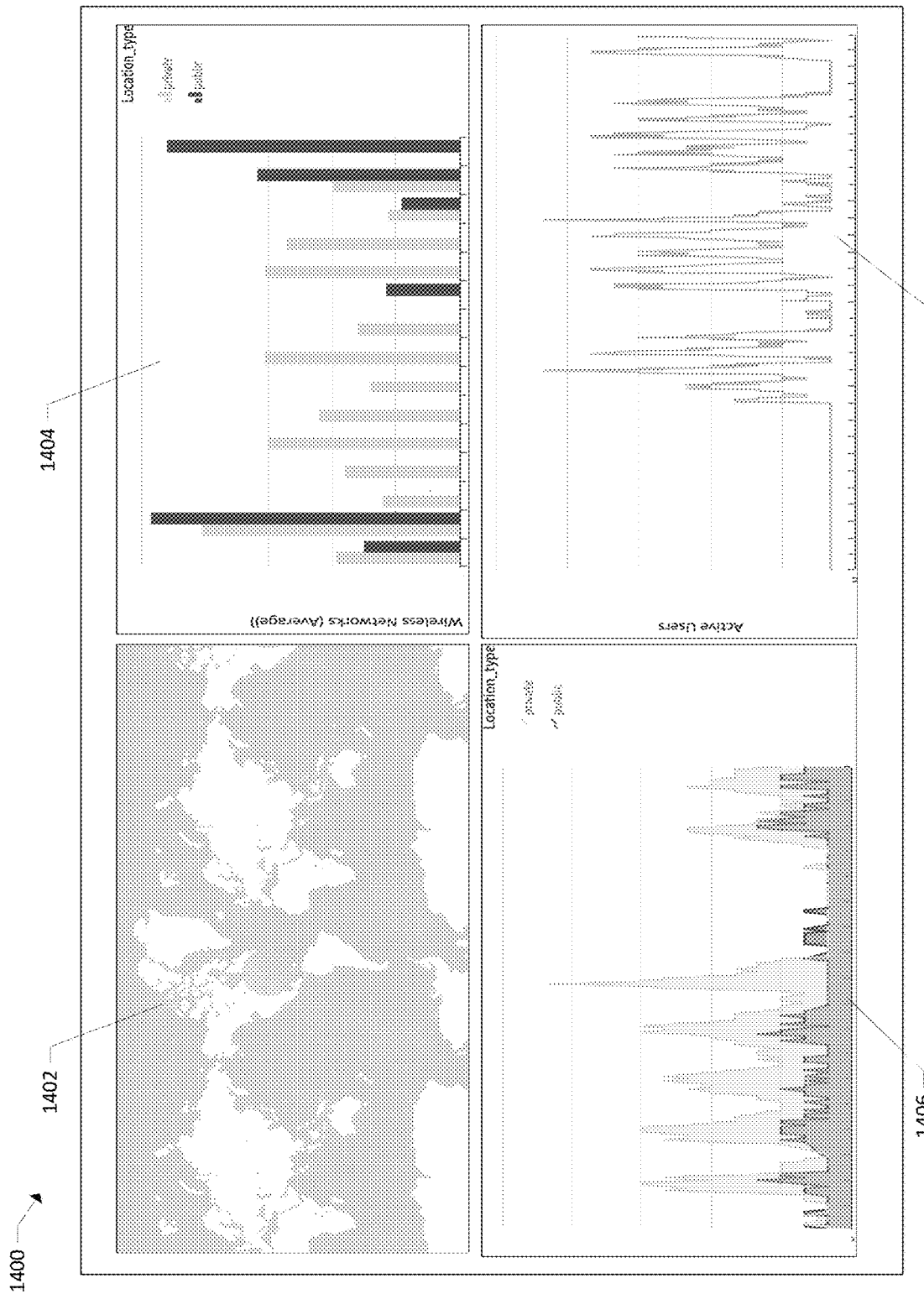
FIG. 14 illustrates an example user interface for accessing and providing input to one or more dashboards associated with anomaly detection in workspaces.

FIG. 14 illustrates an example user interface 1400 for accessing and providing input to one or more dashboards associated with anomaly detection in workspaces. The dashboards may provide information associated with the access and utilization of sensitive data by one or more users of devices authorized to access sensitive data. It should be understood that while several examples of information displayable on the dashboards are provided in FIG. 14, that information is provided by way of example and not as a limitation. Any information associated with the systems described herein may be presented on the dashboard and/or the information and/or information types may change.

For example, the user interface 1400 may include a location indicator portions 1402. The location indicator portion 1402 may provide a visual indication of where a device is connected to a network, such as for accessing sensitive data as described herein. The visual indication may include a map and/or other pictorial representation of location as well as a marker or otherwise an indicator of where the device is located. The location indicator portion 1402 may be selectable, such as to allow for a user to zoom in and zoom out to provide additional context to the location at issue. Additional information about the location, such as the network the device is connected to, an identifier of the location, information about the network such as whether it is private or public, known or unknown, and/or is related to an unsecure environment may be presented.

The user interface 1400 may also include a network identifier portion 1404. The network identifier portion 1404 may be presented, for example and not as a limitation, as a graph, which may show a number of wireless networks associated with devices. The number of wireless networks may be presented as an average number in a given span of time. The X-axis of the graph may include location indicators, such as city names, associated with the networks. By so doing, the network identifier portion 1404 may provide a visual indicator of typical and/or atypical numbers of wireless networks associated with given locations. This information may be utilized by the anomaly detector and/or a user of the system to determine if a number of wireless networks associated with a given device in a given location are problematic or not. The network identifier portion 1406 may also include an indicator of which networks are private and which networks are public, which may also be utilized for anomaly detection purposes.

The user interface 1400 may also include a number-of-users portion 1406. The number-of-users portion 1406 may be presented, for example and not as a limitation, as a graph, which may show a number of users accessing the system in public and private locations. The X-axis of the graph may include time indicators associated with when the users access the system. This information may indicate a number of users, at a given time, that are accessing the system while working in a public location, which may indicate an anomaly. This information may also indicate when users typically work in a public location and a trend of how users are either working more or less in private and public locations. The dashboards may also include (not depicted in FIG. 14), an amount of time spent by users in public and private locations, which may indicate whether given access usage is typical or atypical for a group of users.

The user interface 1400 may also include an active users portion 1408. The active users portion 1408 may be presented, for example and not as a limitation, as a graph, which may show a number of active users at given times. The X-axis of the graph may include time indicators associated with when users access the system. This information may indicate how users access the system over time and/or how many active users access the system at given times. This information may indicate when a given active user's access differs from other user access, which may indicate an anomaly.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system for providing anomaly detection in workspaces, comprising:
   one or more hardware processors; and
   non-transitory computer-readable media storing computer-executable instructions that, when executed by the one or more hardware processors, cause the one or more hardware processors to perform operations comprising:
   determining that a first device is accessing sensitive data, the first device associated with user profile data indicating authorization for the first device to access the sensitive data, wherein the sensitive data includes data that is associated with one or more access controls to limit access to the sensitive data except when authorized;
   in response to determining that the first device is accessing the sensitive data, analyzing sensor data generated by a sensor of the first device configured to detect presence of physical objects and physical attributes of a physical environment associated with the first device, wherein the sensor is configured to determine, at least, what devices are physically connected to the first device;
   querying a contextual data resource for contextual data associated with the analyzed sensor data, the contextual data indicating impermissible and permissible physical attribute contexts of physical environments;
   determining, based at least in part on information access restrictions specific to account data associated with the first device and utilizing the contextual data, at least one reference physical attribute that includes impermissible and permissible physical attribute contexts of physical environments;
   determining, utilizing the physical attributes from the sensor data and the impermissible and permissible physical attribute contexts from the contextual data, that an unsecure condition is associated with the physical environment, the unsecure condition predetermined to indicate that the physical environment is unsecure for accessing the sensitive data due to the presence of the physical objects and the associated physical attributes of the physical environment;
   determining an action to take in response to the unsecure condition; and
   causing the action to be performed, the action restricting unsecure use of the sensitive data.

2. The system of claim 1, the operations further comprising:
   storing first data indicating a first number of times per period of time the sensor data is analyzed;
   storing second data indicating past detection of unsecure conditions associated with the user profile data;
   determining, from the second data, that a number of detections of the unsecure conditions satisfies a threshold number; and
   in response to the number of detections of the unsecure conditions satisfying the threshold number, storing, instead of the first data, third data indicating a second number of times per the period of time that the first device is to be queried for the sensor data, the second number of times being more than the first number of times.

3. The system of claim 1, the operations further comprising:
   determining a data type associated with the sensitive data;
   determining that the data type is a predetermined type indicated as being more sensitive than other data types available to a user associated with the user profile data; and
   selecting, in response to the data type being the predetermined type, the sensor from multiple sensors associated with the first device for receiving the sensor data.

4. The system of claim 1, the operations further comprising:
   determining the unsecure condition is associated with a notification action;
   sending, to a second device associated with manager profile data, notification data indicating the unsecure condition in association with the user profile data;
   receiving response data from the second device, the response data confirming that the action is to be taken; and
   wherein causing the action to be performed is in response to the response data.

5. A method for anomaly detection in workspaces, comprising:
   analyzing sensor data generated by a sensor associated with a first device based at least in part on determining that the first device is accessing sensitive data, the sensor configured to detect presence of physical objects and a physical attribute of a physical environment associated with the first device while the first device accesses first data that includes at least in part the sensitive data, the first data associated with one or more access controls to limit access to the sensitive data except when authorized, wherein the sensor is configured to determine, at least, what devices are physically connected to the first device;
   receiving, based at least in part on querying a contextual data resource, contextual data associated with the analyzed sensor data, the contextual data indicating impermissible and permissible physical attribute contexts of physical environments;
   determining, based at least in part on information access restrictions specific to account data associated with the first device and utilizing the contextual data, a reference physical attribute that includes impermissible and permissible physical attribute contexts of the physical environment;

determining, based at least in part on the physical attribute from the sensor data indicating the presence of the physical objects and the reference physical attribute from the contextual data as received, that a condition is associated with the physical environment, the condition indicating the physical environment is unsecure for accessing the first data due to the presence of the physical objects and the associated physical attributes of the physical environment;

determining an action to take based at least in part on the condition; and causing the action to be performed to mitigate unsecure access of the first data.

6. The method of claim 5, further comprising:
storing first data indicating a first number of times per period of time the sensor data is analyzed;
storing second data indicating past detection of unsecure conditions associated with the first device;
determining, based at least in part on the second data, that a number of detections of the unsecure conditions satisfies a threshold number; and
storing, based at least in part on the number of detections of the unsecure conditions satisfying the threshold number, third data indicating a second number of times per the period of time to query for the sensor data.

7. The method of claim 5, further comprising:
determining a data type associated with the first data;
determining that the data type is a predetermined type indicated as being more sensitive than other data types; and
selecting, based at least in part on the data type being the predetermined data type, the sensor from multiple sensors associated with the first device for receiving the sensor data.

8. The method of claim 5, further comprising:
determining the condition is associated with a notification action;
sending, to a second device associated with manager profile data, notification data indicating the condition has been detected;
receiving response data from the second device, the response data confirming that the action should be taken; and
wherein causing the action to be performed comprises causing the action to be performed based at least in part on the response data.

9. The method of claim 5, further comprising:
determining conditions detected in association with the first device over a period of time;
generating, based at least in part on one or more of the conditions, second data representing instructions for causing the first device to generate the sensor data associated with the one or more of the conditions; and
sending the second data to the first device, the second data stored on the first device and utilized by the first device for generating the sensor data.

10. The method of claim 5, wherein the sensor data includes usage of the first data in association with the first device, the contextual data includes usage of the first data in association with peer user profile data, the peer user profile data associated with individuals indicated as peers of a user associated with the user profile data, and the method further comprises:

determining that the usage of the first data in association with the first device differs from the usage of the first data in association with the peer user profile data by at least a threshold amount; and wherein determining that the condition is associated with the physical environment comprises determining that the condition is associated with the physical environment based at least in part on the usage of the first data in association with the first device differing from the usage of the first data in association with the peer user profile data by the at least the threshold amount.

11. The method of claim 5, wherein:
the sensor data indicates an identifier of a wireless network that the first device is utilizing to access the first data;
the contextual data indicates a geographic location associated with the wireless network, the geographic location indicated as being unsecure; and
determining that the condition is associated with the physical environment comprises determining that the condition is associated with the physical environment based at least in part on the geographic location being unsecure.

12. The method of claim 5, wherein:
the sensor data indicates a device type of a second device that is in communication with the first device;
the contextual data indicates that the device type has been determined to cause the physical environment to be unsecure; and
determining that the condition is associated with the physical environment comprises determining that the condition is associated with the physical environment based at least in part on the second device being in communication with the first device.

13. A system for providing anomaly detection in workspaces, comprising:
one or more hardware processors; and
non-transitory computer-readable media storing computer-executable instructions that, when executed by the one or more hardware processors, cause the one or more hardware processors to perform operations comprising:
analyzing sensor data generated by a sensor associated with a first device based at least in part on determining that the first device is accessing sensitive data, the sensor configured to detect presence of physical objects and a physical attribute of a physical environment associated with the first device while the first device accesses first data that includes the sensitive data, the first data associated with one or more access controls to limit access to the sensitive data except when authorized, wherein the sensor is configured to determine, at least, what devices are physically connected to the first device;
receiving, based at least in part on querying a contextual data resource, contextual data associated with the analyzed sensor data, the contextual data indicating impermissible and permissible physical attribute contexts of physical environments;
determining, based at least in part on information access restrictions specific to account data associated with the first device and utilizing the contextual data, a reference physical attribute that includes impermissible and permissible physical attribute contexts of the physical environment;
determining, based at least in part on the physical attribute from the sensor data indicating the presence of the physical objects and the reference physical attribute from the contextual data as received, that a condition is associated with the physical environment, the condition indicating the physical environment is unsecure for accessing the first data due to the presence of the physical objects and the associated physical attributes of the physical environment;

determining an action to take based at least in part on the condition; and causing the action to be performed to mitigate unsecure access of the first data.

14. The system of claim 13, the operations further comprising:

storing first data indicating a first number of times per period of time the sensor data is analyzed;

storing second data indicating past detection of unsecure conditions associated with the first device;

determining, based at least in part on the second data, that a number of detections of the unsecure conditions satisfies a threshold number; and storing, based at least in part on the number of detections of the unsecure conditions satisfying the threshold number, third data indicating a second number of times per the period of time to query for the sensor data.

15. The system of claim 13, the operations further comprising:

determining a data type associated with the first data;

determining that the data type is a predetermined type indicated as being more sensitive than other data types; and selecting, based at least in part on the data type being the predetermined data type, the sensor from multiple sensors associated with the first device for receiving the sensor data.

16. The system of claim 13, the operations further comprising:

determining the condition is associated with a notification action;

sending, to a second device associated with manager profile data, notification data indicating the condition has been detected;

receiving response data from the second device, the response data confirming that the action should be taken; and wherein causing the action to be performed comprises causing the action to be performed based at least in part on the response data.

17. The system of claim 13, the operations further comprising:

determining conditions detected in association with the first device over a period of time;

generating, based at least in part on one or more of the conditions, second data representing instructions for causing the first device to generate the sensor data associated with the one or more of the conditions; and sending the second data to the first device, the second data stored on the first device and utilized by the first device for generating the sensor data.

18. The system of claim 13, wherein the sensor data includes usage of the first data in association with the first device, the contextual data includes usage of the first data in association with peer user profile data, the peer user profile data associated with individuals indicated as peers of a user associated with the first device, and the operations further comprise:

determining that the usage of the first data in association with the first device differs from the usage of the first data in association with the peer user profile data by at least a threshold amount; and wherein determining that the condition is associated with the physical environment comprises determining that the condition is associated with the physical environment based at least in part on the usage of the first data in association with the first device differing from the usage of the first data in association with the peer user profile data by the at least the threshold amount.

19. The system of claim 13, wherein:

the sensor data indicates an identifier of a wireless network that the first device is utilizing to access the first data;

the contextual data indicates a geographic location associated with the wireless network, the geographic location indicated as being unsecure; and determining that the condition is associated with the physical environment comprises determining that the condition is associated with the physical environment based at least in part on the geographic location being unsecure.

20. The system of claim 13, wherein:

the sensor data indicates a device type of a second device that is in communication with the first device;

the contextual data indicates that the device type has been determined to cause the physical environment to be unsecure; and determining that the condition is associated with the physical environment comprises determining that the condition is associated with the physical environment based at least in part on the second device being in communication with the first device.

* * * * *